US012298700B2

(12) United States Patent
Suzuki et al.

(10) Patent No.: US 12,298,700 B2
(45) Date of Patent: May 13, 2025

(54) IMAGE FORMING APPARATUS CONTROLLING IMAGE FORMING AND SHEET INTERVAL OPERATIONS

(71) Applicant: CANON KABUSHIKI KAISHA, Tokyo (JP)

(72) Inventors: Ai Suzuki, Tokyo (JP); Kensuke Umeda, Kanagawa (JP); Kazuhiro Funatani, Kanagawa (JP); Shinsuke Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/606,986

(22) Filed: Mar. 15, 2024

(65) Prior Publication Data

US 2024/0219863 A1 Jul. 4, 2024

Related U.S. Application Data

(62) Division of application No. 18/094,645, filed on Jan. 9, 2023, now Pat. No. 11,960,232.

(30) Foreign Application Priority Data

Jan. 11, 2022 (JP) ................................ 2022-002596

(51) Int. Cl.
*G03G 21/00* (2006.01)
*G03G 15/00* (2006.01)

(52) U.S. Cl.
CPC ..... *G03G 21/0035* (2013.01); *G03G 15/5008* (2013.01)

(58) Field of Classification Search
USPC ........................................................... 399/71
See application file for complete search history.

(56) References Cited

U.S. PATENT DOCUMENTS

| | | | |
|---|---|---|---|
| 7,912,384 | B2 | 3/2011 | Dan |
| 2006/0039711 | A1 | 2/2006 | Shibuya et al. |

(Continued)

FOREIGN PATENT DOCUMENTS

| | | | |
|---|---|---|---|
| JP | 2007-031020 | A | 2/2007 |
| JP | 2007-065580 | A | 3/2007 |
| JP | 2015-212799 | A | 11/2015 |

*Primary Examiner* — Quana Grainger
(74) *Attorney, Agent, or Firm* — Venable LLP

(57) ABSTRACT

An image forming apparatus includes a rotatable photosensitive member, a charging member, a developing device, a transfer member, a brush, a driving source and a control portion. The control portion controls the driving source to execute an image forming process, in which image formation on the recording material is executed, and a non-image-forming process, in which the photosensitive member is driven to rotate other than in the image forming process. The non-image-forming process between a first recording material and a second recording material, to which the image formation is executed following the first recording material, is defined as a first non-image-forming process, and the non-image-forming process between the second recording material and a third recording material is defined as a second non-image-forming process. The control portion determines a time of the second non-image-forming process based on history information correlating with a usage amount of the photosensitive member and a time of the first non-image-forming process.

8 Claims, 9 Drawing Sheets

(56) References Cited

U.S. PATENT DOCUMENTS

| | | | | |
|---|---|---|---|---|
| 2009/0022509 | A1* | 1/2009 | Nakane ................ | G03G 15/161<br>399/71 |
| 2015/0227107 | A1 | 8/2015 | Ishizuka et al. | |
| 2015/0301494 | A1 | 10/2015 | Kitabayashi et al. | |

* cited by examiner

IMAGE FORMING APPARATUS CONTROLLING IMAGE FORMING AND SHEET INTERVAL OPERATIONS

FIELD OF THE INVENTION AND RELATED ART

The present invention relates to an image forming apparatus, such as a printer, a copier or a fax machine, which uses an electrophotographic method.

In the image forming apparatus of the electrophotographic method, a cleaning blade which is arranged to abut against a surface of a photosensitive drum is widely used as a cleaning means of transfer residual toner which remains on a surface of a photosensitive member (hereinafter, a photosensitive drum will be taken as an example) after the toner image is transferred. Further, as the cleaning means, a brush member which is arranged to abut against a surface of a photosensitive drum may be used. In Japanese Laid-Open Patent Application (JP-A) 2007-65580, a configuration, in which a brush member for cleaning toner on a surface of a photosensitive drum is arranged downstream of a transfer portion and upstream of a charging portion with respect to a rotational direction of the photosensitive drum, is disclosed.

Here, in the image forming apparatus of the electrophotographic method, "image deletion (image flow)" which is an image defect may occur. That is, discharging occurs when the surface of the photosensitive drum is charged by a charging member (hereinafter, "a charging roller" will be taken as an example). Components in the air are decomposed by ozone which has occurred by the discharging, and discharge products such as NOx and SOx are generated. The discharge products are water soluble. Further, when recording material on which a toner image is transferred passes through a fixing device, moisture which is included in the recording material evaporates and water vapor is generated. The discharge products which are described above adsorb the water vapor and significantly reduce surface resistance of the photosensitive drum, and an appropriate electrostatic latent image on the surface of the photosensitive drum is not formed, so a drift of potential occurs and the image deletion is generated.

As a result of the inventors' examination, it was found that the brush member can store moisture which is attached to the surface of the photosensitive drum in a configuration which includes the brush member which is arranged to abut against the surface of the photosensitive drum. Therefore, it was found that the image deletion is unlikely to occur in such a configuration, in a case that a job, in which the number of images which are formed is relatively few, is executed, etc.

However, it was found that when a job, in which the number of images which are formed is relatively large, is executed, moisture may locally flow into the photosensitive drum by exceeding an amount of moisture which the brush member can retain and the image deletion may occur in the area. This is considered to be caused when moisture which flows out from the brush member is absorbed in the discharge products which are deposited on the surface of the photosensitive drum, and the surface resistance of the photosensitive drum is significantly reduced. This phenomenon is likely to occur, for example, in a case that a job, in which the number of images which are formed is relatively large, is executed by using the recording material which is left in a humid environment and absorbs moisture.

SUMMARY OF THE INVENTION

A principal object of the present invention is to suppress the image deletion in the configuration which includes the brush member which is arranged to abut against the surface of the photosensitive member.

The object is achieved with the image forming apparatus according to the present invention. In summary, the image forming apparatus according to the present invention includes a rotatable photosensitive member, a charging member configured to electrically charge a surface of the photosensitive member at a charging portion, a developing device supplying toner to the surface of the photosensitive member electrically charged and configured to form a toner image, a transfer member configured to transfer the toner image from the photosensitive member to a recording material at a transfer portion, a brush contacting the surface of the photosensitive member at downstream of the transfer portion and upstream of the charging portion with respect to a rotational direction of the photosensitive member and configured to form a contacting portion, a driving source configured to rotatably drive the photosensitive member, and a control portion configured to control the driving source to execute an image forming process in which image formation to the recording material is executed and a non-image-forming process in which the photosensitive member is driven to rotate other than the image forming process, wherein the non-image-forming process between a first recording material and a second recording material to which the image formation is executed following the first recording material is defined as a first non-image-forming process, and the non-image-forming process between the second recording material and a third recording material to which image formation is executed following the second recording material is defined as a second non-image-forming process, and wherein the control portion determines a time of the second non-image-forming process based on a history information correlating with a usage amount of the photosensitive member and a time of the first non-image-forming process.

According to another aspect of the present invention, an image forming apparatus includes a rotatable photosensitive member, a charging member configured to electrically charge a surface of the photosensitive member at a charging portion, a developing device supplying toner to the surface of the photosensitive member electrically charged and configured to form a toner image, a transfer member configured to transfer the toner image from the photosensitive member to a recording material at a transfer portion, a brush contacting the surface of the photosensitive member downstream of the transfer portion and upstream of the charging portion with respect to a rotational direction of the photosensitive member and configured to form a contacting portion, a driving source configured to rotatably drive the photosensitive member; and a control portion configured to control the driving source to execute an image forming process in which the image formation to the recording material is executed, a non-image-forming process in which the photosensitive member is driven to rotate other than the image forming process, and a post rotation process in which the photosensitive member is rotated without executing the image forming process after executing the image forming process, wherein the non-image-forming process between a first recording material and a second recording material on which the image formation is executed following the first recording material is defined as a first non-image-forming process, and wherein the control portion determines a time of the post rotation process to be executed after executing the image forming process to the second recording material based on history information correlating with a usage amount of the photosensitive member and a time of the first non-image-forming process.

Further features of the present invention will become apparent from the following description of exemplary embodiments with reference to the attached drawings.

DESCRIPTION OF THE EMBODIMENTS

The image forming apparatus according to the present invention will be more specifically described below, in accordance with the figures.

1. Overall Configuration and Operation of Image Forming Apparatus

Figure 1:
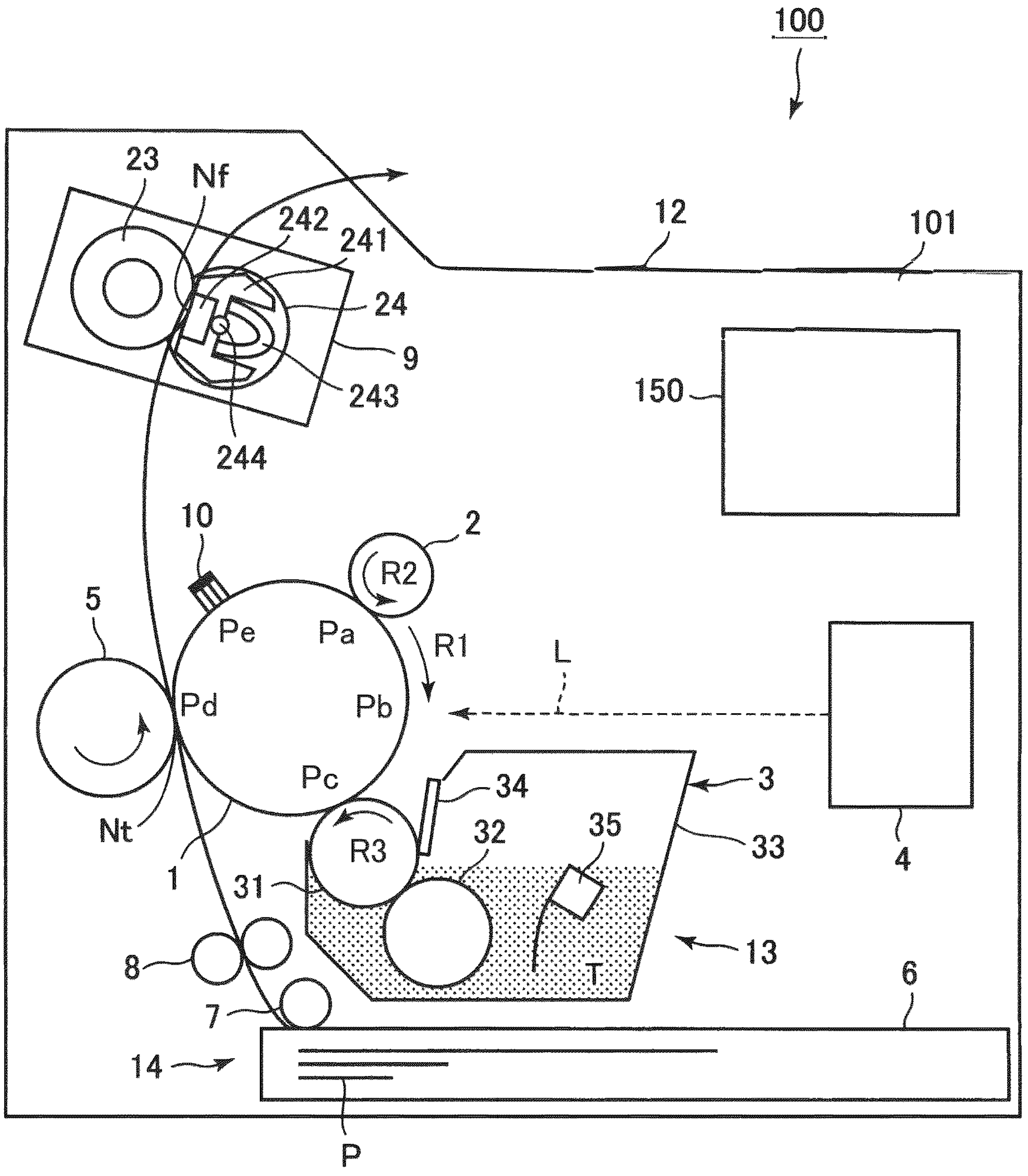
FIG. 1 is a schematic sectional view of an image forming apparatus.

FIG. 1 shows a schematic sectional view of the image forming apparatus 100 according to the embodiment. The image forming apparatus 100 according to the embodiment is a monochrome laser beam printer which is capable of forming black monochrome images, which applies a cleanerless method and a contact charging method.

The image forming apparatus 100 includes a photosensitive drum 1 which is a rotatable drum type (cylindrical type) photosensitive member (electrophotographic photosensitive member) as an image bearing member. When a job operation starts, the photosensitive drum 1 is rotationally driven in a direction of an arrow R1 (clockwise direction) in FIG. 1 by a driving motor 110 (FIG. 3) as a driving source which configures a driving means (driving portion). In the embodiment, an outer diameter of the photosensitive drum 1 is 24 mm, and a peripheral speed (moving speed of surface) of the photosensitive drum 1 is 140 mm/sec.

A surface of the rotating photosensitive drum 1 is uniformly charged to a predetermined potential of a predetermined polarity (negative polarity in the embodiment) by a charging roller 2 which is a roller type charging member (contact charging member) as a charging means. A position in which a charging process by the charging roller 2 on the photosensitive drum 1 with respect to the rotational direction of the photosensitive drum 1 is a charging portion (charging position) Pa. The charging roller 2 electrically charges the surface of the photosensitive drum 1 by means of an electrical discharge which occurs in at least one of microscopic gaps between the photosensitive drum 1 and the charging roller 2 which are formed upstream and downstream of a contact portion between the photosensitive drum 1 and the charging roller 2 with respect to the rotational direction of the photosensitive drum 1. Here, explanation will be described by regarding the contact portion with the charging roller 2 on the photosensitive drum 1 with respect to the rotational direction of the photosensitive drum 1 as the charging portion (charging position) Pa. The charging roller 2 is an elastic roller which is configured so that a conductive elastic layer is provided around a core metal. The charging roller 2 is arranged in contact with the surface of the photosensitive drum 1. In the embodiment, the charging roller 2 is rotationally driven in a direction of an arrow R2 (counterclockwise direction) in FIG. 1 by a driving motor as a driving source which configures a driving means (driving portion). Incidentally, the driving motor which drives the charging roller 2 may be a common driving motor (main motor) with the driving motor 110 which drives the photosensitive drum 1, or it may be a separate driving motor. Further, the charging roller 2 may be configured to be rotationally driven by the rotation of the photosensitive drum 1. During a charging process, a predetermined charging voltage (charging bias), which is DC voltage of negative polarity, is applied to the charging roller 2 by a charging power source E1 (FIG. 3) as a charging voltage applying means (charging voltage applying portion). In the embodiment, the charging voltage is, as an example, −1200V, which uniformly charges the surface of photosensitive drum 1 to a dark portion potential Vd of −600V.

The surface of the photosensitive drum 1, which is charged, is scanned for exposure when a laser beam L which is modulated according to image data is emitted by an exposure device (laser scanner device) 4 as an exposure means (electrostatic image forming means). The exposure device 4 forms an electrostatic latent image (electrostatic image) on the surface of the photosensitive drum 1 by repeating exposure along a main scanning direction (direction of rotational axis) of the photosensitive drum 1 by the laser beam L along a subscanning direction (moving direction of the surface). In the embodiment, a dark portion potential Vd on the surface of photosensitive drum 1, which is formed by a uniformly charged process, is decreased in absolute value by being exposed with the exposure device 4, and becomes a light portion potential Vl of-100V. A position which is exposed by the exposure device 4 on the photosensitive drum 1 with respect to the rotational direction of the photosensitive drum 1 is an exposure portion (exposure position) Pb. Incidentally, the exposure device 4 is not limited to a laser scanner device, however; it may be, for example, an LED array in which a plurality of LEDs are arranged along the direction of the rotational axis of the photosensitive drum 1.

The electrostatic latent image which is formed on the surface of photosensitive drum 1 is developed (visualized) by supplying toner as a developer by a developing device 3 as a developing means, and a toner image (toner image, developer image) is formed on the surface of photosensitive drum 1. The developing device 3 includes a developing roller 31 as a developer carrying member, a toner supplying roller 32 as a developer supplying means, a developer accommodating container 33 which accommodates toner, and a developer blade 34 as a regulating member which regulates the toner on the developing roller 31. The toner which is accommodated in the developer accommodating container 33 is mixed by a mixing member 35 which is provided in the developer accommodating container 33 and is supplied to a surface of the developing roller 31 by the toner supplying roller 32. The toner which is supplied to the surface of the developing roller 31 is uniformly thinned by passing through a contact portion between the developing roller 31 and the developing blade 34, and is charged with negative polarity by frictional charging. The developing roller 31 is arranged in contact with the surface of the photosensitive drum 1. Incidentally, in the embodiment, a single component nonmagnetic contact developing method as a developing method is used, however, a developing method is not limited to this and a two component nonmagnetic contact method or a noncontact developing method may be used. Further, a magnetic developing method may be used. Further, in the embodiment, a normal charging polarity of the toner, which is a primary charging polarity of the toner during developing, is negative polarity. However, the normal charging polarity of the toner is not limited to negative polarity, but may be positive polarity. In a case that the normal charging polarity of the toner is positive polarity, a relation of voltage, etc. as will be described below, may be the opposite polarity in the embodiment, as appropriate.

The developing roller 31 is rotationally driven in a direction of an arrow R3 (counterclockwise) in FIG. 1 by a driving motor as a driving source which configures a driving means (driving portion). In the embodiment, the developing roller 31 rotates so that the surface of the photosensitive drum 1 and the surface of the developing roller 31 move in a same direction in the contact portion between the photosensitive drum 1 and the developing roller 31. Incidentally, the driving motor which drives the developing roller 31 may be a common driving motor (main motor) with the driving motor 110 which drives the photosensitive drum 1, or it may be a separate driving motor. During a developing process, a predetermined developing voltage (developing bias), which is a DC voltage of negative polarity, is applied to the developing roller 31 by a developing power source E2 (FIG. 3) as a developing voltage applying means (developing voltage applying portion). In the embodiment, the developing voltage is −300V as an example. In the embodiment, the toner which is charged with a same polarity as that of the photosensitive drum 1 (negative polarity in the embodiment) adheres to an image portion (exposed surface, image portion) on the photosensitive drum 1, in which an absolute value of potential is decreased due to exposure after being uniformly charged (reverse developing method). A position in which developing is performed on the photosensitive drum 1 with respect to the rotational direction of the photosensitive drum 1 (a contact portion with the developing roller 31 on the photosensitive drum 1) is a developing portion (developing position) Pc. In the embodiment, the developing device 3 is configured so that the developing roller 31 is always in contact with the photosensitive drum 1. However, the developing device 3 is not limited to such a configuration, but it may be configured so that it is possible to switch the developing roller 31 and the photosensitive drum 1 between a contacting state and a spacing state. For example, the image forming apparatus 100 is provided with a contacting/spacing mechanism which switches between the contacting state and the spacing state which is described above. And, during a pre rotation process which will be described below, the photosensitive drum 1 is rotated while the developing roller 31 is spaced away from the photosensitive drum 1, and during an image forming process (developing process) which will be described below, the developing roller 31 abuts against the photosensitive drum 1.

A transfer roller 5 which is a roller type transfer member as a transfer means is arranged while it is opposed to the photosensitive drum 1. The transfer roller 5 is arranged in contact with the surface of the photosensitive drum 1. The toner image which is formed on the surface of the photosensitive drum 1 is transferred to a surface of a recording material P such as paper, which is nipped between the photosensitive drum 1 and the transfer roller 5 and conveyed by the transfer roller 5 in a transfer nip portion Nt which is a contact portion between the photosensitive drum 1 and the transfer roller 5. A position in which the toner image on the photosensitive drum 1 with respect to the rotational direction of the photosensitive drum 1 is transferred (a contact portion with the transfer roller 5 on the photosensitive drum 1), that is, a position on the photosensitive drum 1 which forms the transfer nip portion Nt which is described above, is a transfer portion (transfer position) Pd. In the embodiment, the transfer roller 5 is an elastic roller, which is configured so that an elastic layer which is made of conductive NBR (Nitrile Butadiene Rubber)/Hydrin sponge rubber around a core metal is provided. In the embodiment, an outer diameter of the transfer roller 5 is 12 mm and a hardness of it is 30° (Asker C, 500 gf load). The transfer roller 5 is pressed against the surface of the photosensitive drum 1 at a predetermined pressure. The sheet recording material (transfer material, recording medium, sheet) P, which is a transferred material, is accommodated in a cassette 6 which is a recording material accommodating portion. The recording material P which is accommodated in the cassette 6 is fed from the cassette 6 by a feeding roller 7, etc., and is conveyed to the transfer nip portion Nt so that a timing of the toner image on the photosensitive drum 1 is matched with it by a conveying roller 8, etc. In the embodiment, a conveying device 14 of the recording material P is configured by the feeding roller 7, the conveying roller 8, etc. During a transfer process, a predetermined transfer voltage (transfer bias), which is a DC voltage of an opposite polarity (positive polarity in the embodiment) to the normal polarity of the toner, is applied to the transfer roller 5 by a transfer power source E3 (FIG. 3) as a transfer voltage applying means (transfer voltage applying portion). Thus, an electric field between the transfer roller 5 and the photosensitive drum 1 is formed, and the toner image is electrostatically transferred from the photosensitive drum 1 to the recording material P by an action of the electric field. In the embodiment, the transfer voltage is +1000V as an example.

The recording material P in which the toner image is transferred is conveyed to a fixing device 9 as a fixing means. The fixing device 9 applies heat and pressure to the recording material P which bears an unfixed toner image and fixes (melts and fixes) the toner image onto the surface of the recording material P. Incidentally, the fixing device 9 will be described further below. The recording material P onto which the toner image is fixed is discharged (output) to an outside (outside of the apparatus) of a main assembly 101 of the image forming apparatus 100, and is stacked on a tray 12 which is provided at a top of the main assembly 101.

Further, the toner (transfer residual toner) which remains on the surface of the photosensitive drum 1 without being transferred to the recording material P during the transfer process is sent to a brush member 10 which is provided downstream from the transfer roller 5 with respect to the rotational direction of the photosensitive drum 1. Incidentally, for example, in a case that high resistance paper such as thick paper or paper which has been left in a low humidity environment is used as the recording material P, the transfer residual toner tends to be a large amount and the transfer residual toner accumulates on the brush member 10, it may be done as follows. That is, during a non-image-forming process (for example, during a sheet interval process) as will described below, a surface potential of the photosensitive drum 1 may be adjusted and the toner, etc. which is charged with positive polarity which is the opposite of the normal charging polarity which is accumulated on the brush member 10 may be discharged to the photosensitive drum 1 for cleaning. The toner which is discharged from the brush member 10 is charged again to negative polarity by discharge in a charging portion Pa. The developing voltage is set to a potential between a potential of a non-image-portion and a potential of an image portion on the surface of the photosensitive drum 1, as described above. Thus, the toner, which is again charged with negative polarity, is removed from the photosensitive drum 1, transferred to the developing roller 31, and collected in the developer accommodating container 33.

Incidentally, in the embodiment, the developing voltage and the surface potential of the developing roller 31 may be regarded as almost same, although they may go up and down to some extent depending on an amount of charge of toner and an amount of toner which is coated on the developing roller 31.

Incidentally, a configuration and an action of the brush member 10 will be described in detail below.

Further, in the embodiment, the photosensitive drum 1, the charging roller 2 as a process means which acts on the photosensitive drum 1, the developing device 3 and the brush member 10 which will be described below, configure a process cartridge 13 which is integrally dismountable from the main assembly 101.

2. Fixing Device

In the embodiment, the fixing device 9 is a heating device of a film heating method which is designed to reduce a startup time and achieve low power consumption. The fixing device 9 includes a cylindrical fixing film 24 as a rotatable member. The fixing film 24 is a flexible, rotatable, endless belt. A shape of the fixing film 24 is not limited to a cylindrical shape, however, it may be designed as appropriate. In an inner space of the fixing film 24 (space which is surrounded by an inner peripheral surface), a ceramic heater 242 as a heating member, a heater holder 241 as a holding member which holds the ceramic heater 242, an iron stay 243 and a temperature detecting element 244 are provided. The heating member is not limited to the ceramic heater 242, however, for example, any known heating member may be used as appropriate. Further, the stay 243 is not limited to the iron stay, however, for example, any known stay may be used as appropriate.

Further, the fixing device 9 includes a pressing roller 23 as a pressing member. The pressing roller 23 forms a fixing nip portion Nf which is a contact portion (heating portion) between the fixing film 24 and the pressing roller 23, together with the ceramic heater 242 via the fixing film 24. The pressing roller 23 is rotationally driven by a driving motor as a driving source which configures a driving means (driving member). Incidentally, the driving motor which drives the charging roller 23 may be a common driving motor (main motor) with the driving motor 110 which drives the photosensitive drum 1, or it may be a separate driving motor. Further, the fixing film 24 is rotated by receiving power from the pressing roller 23 at the fixing nip portion Nf. Heat from the ceramic heater 242 is transmitted from an inner peripheral surface to a surface (outer peripheral surface) of the fixing film 24, and a surface (outer peripheral surface) of the pressing roller 23 is also heated at the fixing nip portion Nf.

In the embodiment, a width of the pressing roller 23 is 220 mm and an outer diameter of the pressing roller 23 is φ14 mm with respect to a direction of a rotational axis of the pressing roller 23, the pressing roller 23 is configured so that a 2.5 mm thick elastic layer (foamed rubber) in which silicone rubber is foamed is formed around a core metal which is made of iron with an outer diameter of φ9 mm. A mold release surface layer which is configured of PFA (tetrafuluoroethylen-perfluoroalkoxyethylene copolymer resin) is formed on the elastic layer of the pressing roller 23 as a mold release layer for the toner. Surface hardness of the pressing roller 23 which includes the mold release surface layer, is 83° by using an Asker CSC2 durometer. However, the pressing member is not limited to such a configuration and it may be designed as appropriate.

Further, the temperature detecting element 244 is arranged on a back of the ceramic heater 242 and detects the temperature of the ceramic heater 242 which is raised according to heat generation of a conducting heat generation resistance layer. A control unit 150, which will be described below, is possible to adjust the temperature of the ceramic heater 242 by appropriately controlling a current which flows from an electrode portion (not shown) which is provided at an end portion of the ceramic heater 242 with respect to a longitudinal direction to the conducting heat generation resistance layer according to a signal from the temperature detecting element 244. Incidentally, the longitudinal direction of the ceramic heater is substantially parallel to a direction of a rotational axis of the pressing roller 23.

In the embodiment, the temperature adjusting temperature of the fixing device 9 is 180° C. during an image forming process (during a fixing process), which will be described below, when the recording material P is passing through the fixing device 9. Further, the temperature adjusting temperature of the fixing device 9 during a non-image-forming process (for example, during a sheet interval process), which will be described below, is optimized for each process with respect to the temperature adjusting temperature during the image forming process. For example, in the embodiment, the temperature adjusting temperature during the normal sheet interval process is 180° C., which is same temperature as the temperature adjusting temperature during the imaging forming process. On the other hand, in a case that the sheet interval process is extended, as will be described below, the temperature adjusting temperature during the sheet interval process is reduced by approximately from −100° C. to −10° C. with respect to the temperature adjusting temperature during the image forming process. In a case that the sheet interval process is extended, when the photosensitive drum 1 continues to rotate idly at a high temperature adjusting temperature, members which relate to the image forming, such as the photosensitive drum 1 and the developing roller 31, and the toner may be damaged by heat from the fixing device 9. However, when the temperature adjusting temperature is set too low, the fixing device 9 may not warm up sufficiently when switching from the sheet interval process to the image forming process, and a defective fixing of the toner to the recording material P may occur. Therefore, in the embodiment, the temperature adjusting temperature during the sheet interval process when the sheet interval process is extended, as will be described below, is −60° C. (that is 120°

C.) with respect to the temperature adjusting temperature during the image forming process (during the fixing process). Further, in the embodiment, the ceramic heater 242 is turned off during the post rotation process, which will be described below.

In the fixing device 9, when the recording material P which bears an unfixed toner image is conveyed to the fixing nip portion Nf, heat from the fixing film 24 and the pressing roller 23 is transmitted to the unfixed toner image and the recording material P, and the toner image is fixed on the recording material P.

3. Configuration of Brush Member

Next, the brush member 10 according to the embodiment will be described.

As shown in FIG. 1, the image forming apparatus 100 according to the embodiment includes the brush member 10 which is arranged abutting with the surface of the photosensitive drum 1. The brush member 10 contacts the surface of the photosensitive drum 1 in a downstream side from a transfer portion Pd and in an upstream side from the charging portion Pa with respect to the rotational direction of the photosensitive drum 1. A brush contact portion (brush contact position) Pe is a contact portion with the brush member 10 on the photosensitive drum 1 with respect to the rotational direction of the photosensitive drum 1.

Figure 2:
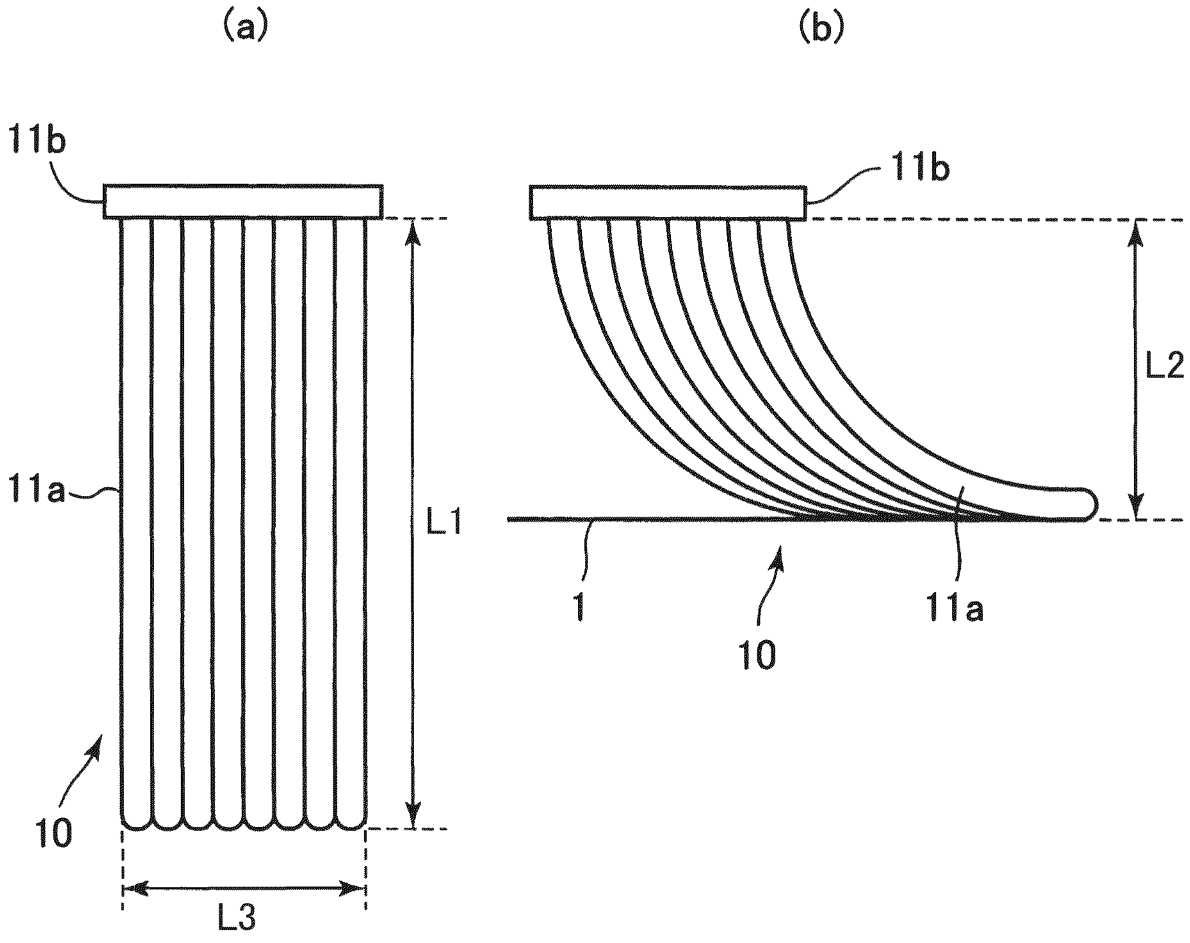
FIG. 2, part (a) and part (b), is a schematic view of a brush member.

Part (a) of FIG. 2 is a schematic view of the brush member 10 in a single body state, which is viewed along its longitudinal direction (substantially parallel to the direction of the rotational axis of the photosensitive drum 1). Further, part (b) of FIG. 2 is a schematic view of the brush member 10 which is viewed along its longitudinal direction while it abuts against the photosensitive drum 1.

The brush member 10 is configured of a conductive fixed brush which is fixedly arranged. The brush member 10 is configured so that the brush member 10 includes a pile yarn 11*a* which is a plurality of bristles which slide on or along the surface of the photosensitive drum 1, and a base fabric 11*b* which supports the pile yarns 11*a*. The brush member 10 is arranged so that its longitudinal direction is substantially parallel to the direction of the rotational axis of the photosensitive drum 1. In the embodiment, the brush member 10 is configured so that the pile yarn (conductive yarn) 11*a*, which is formed of nylon fiber (fiber which is made of conductive nylon 6), which is blended with a conductive substance, is woven into the base fabric (conductive base fabric) 11*b*, which is formed of synthetic fiber, which includes carbon as a conductive agent. Incidentally, rayon, acrylic, polyester, etc., may be used as a material for the pile yarn 11*a* besides nylon.

As shown in part (a) of FIG. 2, a distance from the base fabric 11*b* to a leading end of the exposed pile yarn 11*a* is defined as a pile length L1, when the brush member 10 is in a single body state, that is, when no external force is applied to bend the pile yarn 11*a*. In the embodiment, the pile length L1 is 6.5 mm. The brush member 10 is arranged so that the base fabric 11*b* is fixed to a support member (not shown) which is mounted at a predetermined position in the image forming apparatus 100 by means of double sided tape, etc., and the leading end of the pile yarn 11*a* enters the photosensitive drum 1. In the embodiment, clearance between the support member which is described above and the photosensitive drum 1 is fixed. And as shown in part (b) of FIG. 2, a shortest distance from the base fabric 11*b* of the brush member 10, which is fixed to the support member which is described above, to the photosensitive drum 1 is defined as L2. In the embodiment, a difference between the distance L2 which is described above and the pile length L1 is defined as "amount of the brush member 10 entering the photosensitive drum 1". In the embodiment, the amount of the brush member 10 entering the photosensitive drum 1 is 1 mm.

Further, in the embodiment, as shown in part (a) of FIG. 2, when the brush member 10 is in a single body state, a length L3 of the brush member 10 in a direction along a peripheral direction of the photosensitive drum 1 (hereinafter also referred to as a lateral direction) is 5 mm. Further, in the embodiment, a length of the brush member 10 in the longitudinal direction is 216 mm. Thus, the brush member 10 is possible to contact an entire region of an image forming region (a region in which a toner image may be formed) on the photosensitive drum 1 with respect to the direction of the rotational axis of the photosensitive drum 1. Further, in the embodiment, a thickness of the pile yarn 11*a* is 2 denier, a density of the pile yarn 11*a* is 280 $kF/inch^2$ ($kF/inch^2$ is a unit of brush density and indicates the number of filaments per square inch) and a fineness of the pile yarn 11*a* is 220T/96F (which means 96 bundles of yarn with a thickness of 220 g per 10000 m).

In this way, in the embodiment, the brush member 10 is supported by the support member (not shown) and arranged so that the brush member 10 abuts against the photosensitive drum 1 at a fixed position, and the pile yarn 11*a* slides on the surface of the photosensitive drum 1 as the surface of the photosensitive drum 1 moves. In the embodiment, such brush member 10 includes a function of a cleaning member (contact member, collection member) as a cleaning means (cleaning mechanism) of the photosensitive drum 1. The brush member 10 is possible to collect a residual transfer toner which remains on the surface of the photosensitive drum 1 and paper dust which is generated from the recording material P and adhered to the surface of the photosensitive drum 1 in the transfer portion Pd. Further, as will be described in detail below, the brush member 10 is possible to collect water vapor which is attached to the surface of photosensitive drum 1. The brush contact portion (brush contact position) Pe is a position in which the toner, the paper dust or the water vapor is collected by the brush member 10 on the photosensitive drum 1 with respect to the rotational direction of the photosensitive drum 1.

Incidentally, the configuration of the brush member 10 is not limited to a configuration according to the embodiment. The configuration of the brush member 10 is possible to be changed appropriately according to, for example, an end of lifetime of the image forming apparatus 100 and the process cartridge 13, or a maximum image forming width of the image forming apparatus 100 (maximum width of the image forming region in the direction of the rotational axis of the photosensitive drum 1).

4. Control Mode

Figure 3:
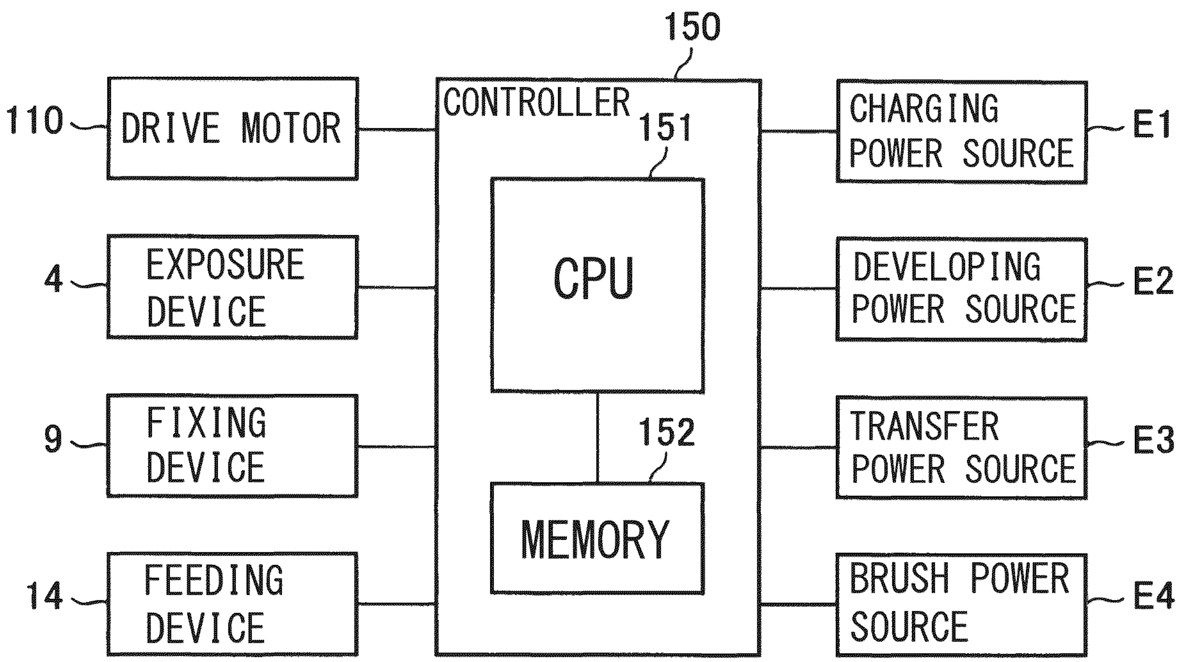
FIG. 3 is a schematic block diagram illustrating a control mode of the image forming apparatus.

FIG. 3 is a schematic block diagram illustrating a control mode of the 100 image forming apparatus according to the embodiment. The image forming apparatus 100 is provided with a control portion 150. The control portion 150 includes a CPU 151 as an arithmetic control means which is a central element which performs arithmetic processing, a memory (storing element) 152 such as ROM and RAM as a storing portion, an input/output portion (not shown) which controls sending/receiving a signal between various elements which are connected to the control portion 150, etc. The ROM also includes a rewritable nonvolatile memory. The RAM stores sensor detection results, arithmetic results, etc., while the ROM stores control programs, pre-determined data tables, etc. In the embodiment, a memory 152 stores, for example, information on the number of rotations and a rotation distance (surface moving distance of the photosensitive drum 1) of the photosensitive drum 1 as information on use history of the photosensitive drum 1, or the number of sheets of the recording material P on which images have been formed (here, it is also referred to as "the number of image forming sheets"), etc. Incidentally, the information on the use history of the photosensitive drum 1 is not limited to the information which is described above, however, it may be any information which changes with use of the photosensitive drum 1. Information about the use history of the photosensitive drum 1 may be information about a film thickness (thickness of a photosensitive layer or a surface layer) of the photosensitive drum 1, etc.

The control portion 150 is a control means which comprehensively controls an operation of the image forming apparatus 100. The control portion 150 controls sending/receiving of various electrical information signals, a timing of driving, etc. and executes a predetermined image forming sequence. The control portion 150 is connected to each portion of the image forming apparatus 100. For example, the control portion 150 is connected to the charging power source E1, the developing power source E2, the transfer power source E3, the driving motor 110, the exposure device 4, the fixing device 9, the conveying device 14, etc. In the embodiment, the control portion 150 is possible to control an extended operation of a sheet interval process and a post rotation process which will be described below, by controlling an operation of each portion of the image forming apparatus 100 (ON/OFF and output value of power source, drive/stop of the driving motor 110, drive/stop of the conveying device 14, etc.). Incidentally, FIG. 3 also illustrates the brush power source E4 which will be described below.

Incidentally, in the embodiment, a usual time of the sheet interval process is 50 msec and a usual time of post rotation process is 4 seconds. The time of the sheet interval process and the time of the post rotation process are set appropriately. A setting method of the time of the sheet interval process and the time of the post rotation process will be described in detail below.

Here, the image forming apparatus 100 is capable of executing a job (image output operation) which is a series of operations to form images on a single or a plurality of the recording material P, which is initiated by a single start instruction. In the embodiment, the start instruction is input to the image forming apparatus 100 from an external device such as a personal computer (not shown). The job generally includes an image forming process (printing process) and a non-image-forming process (non-printing process). Further, as the non-image-forming process, the job generally includes a pre rotation process, the sheet interval process (image interval process) in a case of forming images on a plurality of the recording material P, the post rotation process, etc. The image forming process is a period during actually forming an electrostatic latent image on the photosensitive drum 1, developing the electrostatic latent image (forming a toner image), transferring the toner image, fixing the toner image, etc. and the time of the image forming process (image forming time) refers to the period. For more detail, a timing of the time of the image forming process differs at positions in which the electrostatic latent image is formed, the toner image is formed, the toner image is transferred, the toner image is fixed, etc. Therefore, the image forming operation may be defined as until transferring of the toner image or until fixing of the toner image. This is because even when the image forming operation which is performed on the photosensitive drum 1 is completed and the operation of the photosensitive drum 1 is switched from the image forming operation to the non-image-forming operation, it will not have any effects on the image which has been transferred to the recording material P. The pre rotation process is a period of performing a preparation operation prior to the image forming process. The sheet interval process (image interval process) is a period which corresponds to a period between the recording material P and the recording material P when the image forming process is continuously performed on a plurality of the recording materials P. The post rotation process is a period of performing an arrangement operation (preparation operation) after the image forming process. The non-image-forming process time (non-image-forming time) is a period of time other than the image forming process time (image forming time), and includes the pre rotation process, the sheet interval process, the post rotation process, which are described above, furthermore, a pre multi rotation process which is a preparation operation when the image forming apparatus 100 is turned on or returns from sleep mode, etc.

5. Extended Operation of Sheet Interval Process and Post Rotation Process

<Collection of Water Vapor by Brush Member>

In the image forming apparatus 100, when a job in which images are formed continuously on a plurality of the recording materials P is executed, image deletion may occur. This occurs when water which has accumulated on the brush member 10 and overflowed from the brush member 10 is absorbed by discharge products which are deposited on the surface of photosensitive drum 1 due to image forming and surface resistance of the photosensitive drum 1 is significantly lowered.

Figure 4:
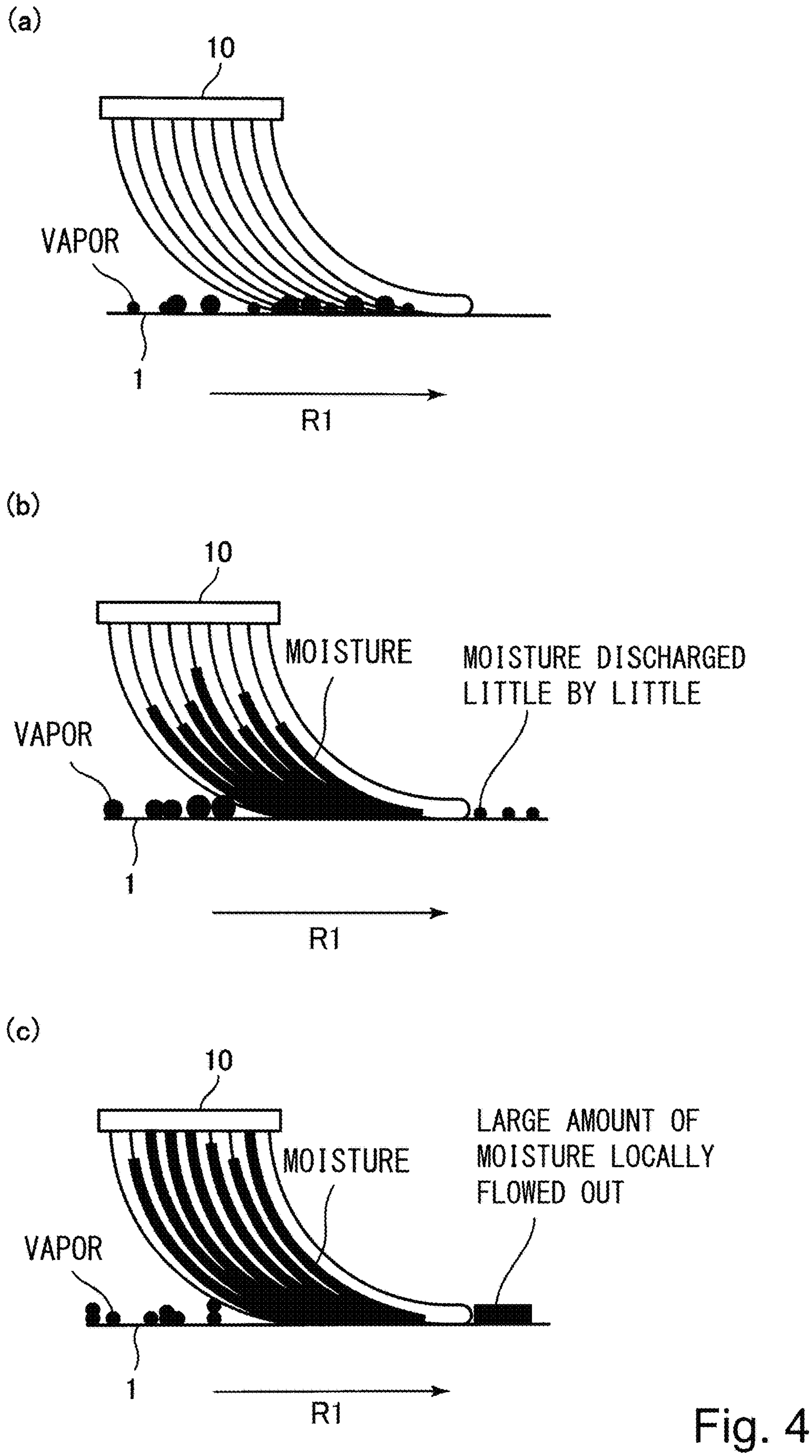
FIG. 4, part (a), part (b) and part (c), is a schematic diagram illustrating collection of water vapor by the brush member.

FIG. 4, parts (a) to (c) is a schematic view illustrating an action of the brush member 10 on water vapor which is attached on the surface of the photosensitive drum 1. When the recording material P which includes moisture passes through the fixing device 9, water vapor is generated, and the water vapor floats inside the image forming apparatus 100 and is attached to the surface of the photosensitive drum 1. When the brush member 10 is dry, the water vapor which is attached to the surface of photosensitive drum 1 is collected by the brush member 10, as shown in part (a) of FIG. 4. After that, the brush member 10 sequentially collects the water vapor from the surface of the photosensitive drum 1 by sucking up the water vapor from the surface of the photosensitive drum 1 through a capillary phenomenon of a thin gap of each hair of the brush member 10, or by absorbing water by the hair itself of the brush member 10, as shown in part (b) of FIG. 4. At this time, the brush member 10 collects the water vapor, while the water which is accumulated in the brush member 10 is discharged onto the surface of the photosensitive drum 1 little by little to an extent that it does not affect image forming. The water which is discharged onto the surface of the photosensitive drum 1 little by little is likely to be evaporated because of its larger specific surface area which contacts surrounding air. Thus, when it is possible to maintain a condition which is shown in part (b) of FIG. 4, it is possible to reduce an amount of water which is adsorbed on the discharge products which are deposited on the surface of the photosensitive drum 1, so it is possible to suppress a decrease in the surface resistance of the photosensitive drum 1 and suppress an occurrence of the image deletion.

However, as shown in part (c) of FIG. 4, when continuous image forming on a plurality of the recording materials P continues and the amount of water which is collected by the brush member 10 exceeds the water retention capacity of the brush member 10, the water may flow out locally on the surface of the photosensitive drum 1. This phenomenon is referred to as a localized breakdown of a water retention function of the brush member 10. In that area, a large amount of the water is adsorbed by the discharge products which are deposited on the surface of the photosensitive drum 1, so the surface resistance of the photosensitive drum 1 is reduced significantly. As a result, a lateral flow of potential occurs at an edge portion of the electrostatic latent image which is formed on the surface of the photosensitive drum 1, and the image deletion occurs. Therefore, in order to suppress the image deletion, it is necessary to control the amount of the water which is retained in the brush member 10, to maintain conditions which are shown in part (a) of FIG. 4 or part (b) of FIG. 4 and to prevent the amount of the water which is retained in the brush member 10 from becoming excessively high, as shown in part (c) of FIG. 4.

Figure 5:
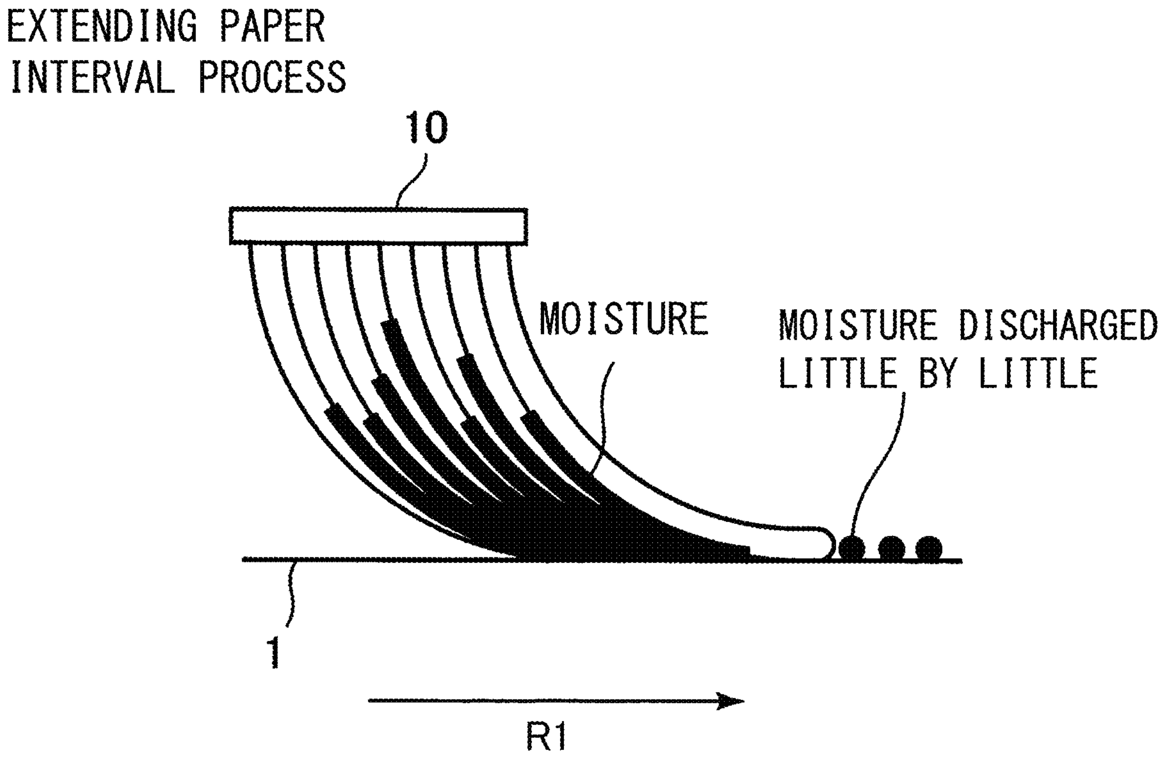
FIG. 5 is a schematic diagram illustrating discharge of moisture from the brush member.

The amount of the water which is retained in the brush member 10 increases with the number of the sheets of the recording material P which are continuously conveyed in the usual time of the sheet interval process (50 msec). Here, the number of the sheets of the recording material P, which are continuously conveyed in the usual time of the sheet interval process (50 msec) without interposing the post rotation process or the sheet interval process in which the time is changed, is defined as "the number of continuous image forming sheets". Further, here, continuous image forming which is continuously performed in the usual time of the sheet interval process (50 msec) without interposing the post rotation process or the sheet interval process in which the time is changed, is defined simply as "continuous image forming". On the other hand, it is possible to reduce the water which is retained in the brush member 10 by rotating the photosensitive drum 1 idly without conveying the recording material P. This is because, as shown in FIG. 5, while no new water vapor is supplied to the surface of the photosensitive drum 1, the water vapor which is collected on the brush member 10 is possible to discharge little by little to the surface of the photosensitive drum 1 and evaporate. Incidentally, FIG. 5 is a schematic view, similar to parts (a) to (c) of FIG. 4, illustrating the action of the brush member 10 on the water vapor which is attached on the surface of the photosensitive drum 1. That is, it is possible to control the amount of the water which is collected by the brush member 10 by changing appropriately the number of continuous image forming sheets and a time of the sheet interval process or the post rotation process which are the non-image-forming process after that.

<Overview of method for setting time of sheet interval process and post rotation process>

An overview of a method for setting a time of the sheet interval process and the post rotation process according to the embodiment will be described below.

In the embodiment, the control portion 150 determines a time of a second non-image-forming process which is a control object according to information about the use history of the photosensitive drum 1 and information about a time of a first non-image-forming process. In the embodiment, the information about the use history of the photosensitive drum 1 is the information of "the number of image forming sheets". Further, in the embodiment, the information about the time of the first non-image-forming process which is described above is information of "the time of the sheet interval process between a first recording material (preceding sheet) P and a second recording material (subsequent sheet) P which follows it." Further, in the embodiment, the time of the second non-image-forming process, which is the control object which is described above, is "the time of the sheet interval process or the post rotation process, which is the non-image-forming process immediately after the image forming process on the second recording material P."

Figure 9:
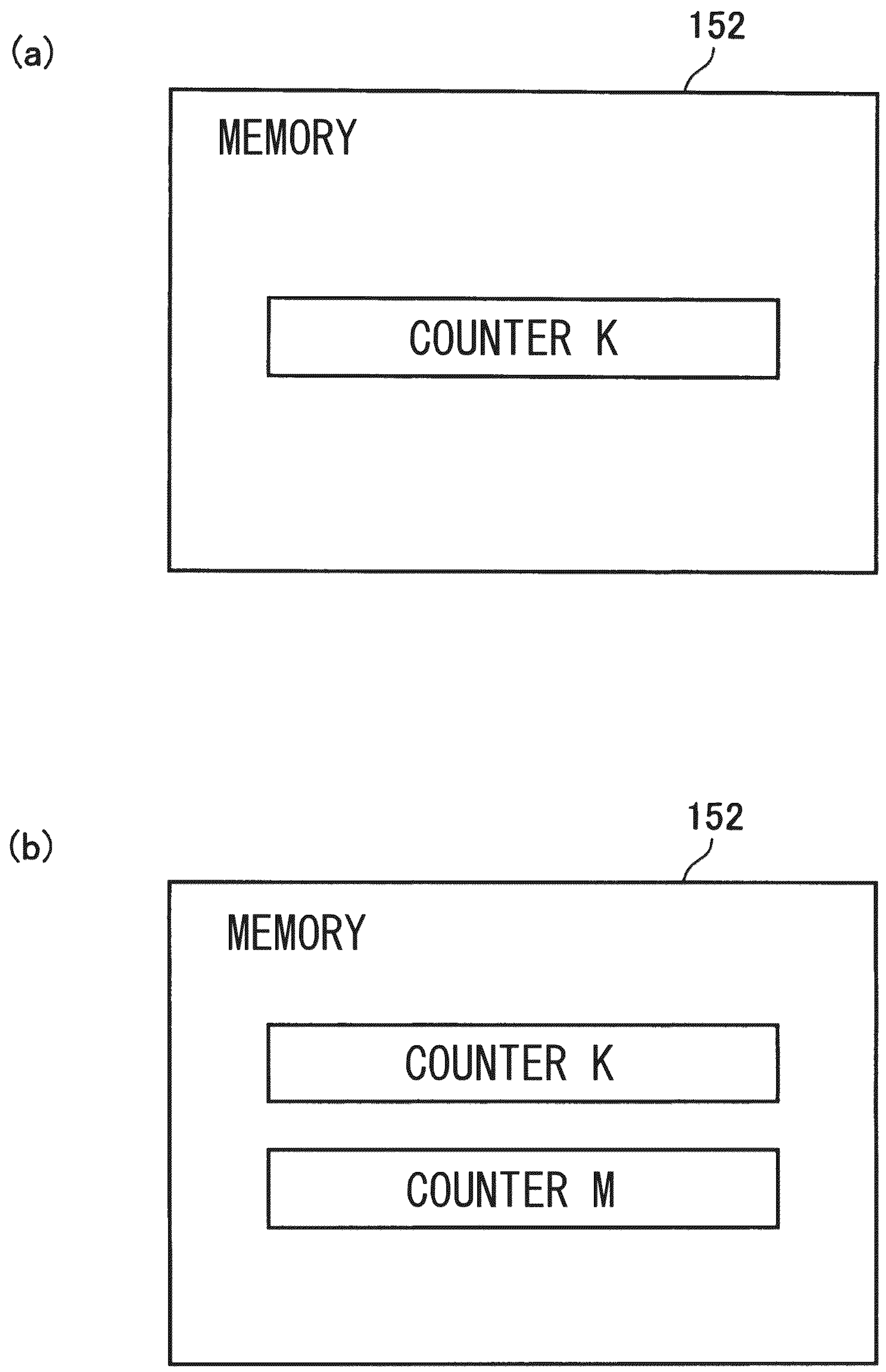
FIG. 9, part (a) and part (b), is a schematic diagram showing a storing method of use history information.

In particular, in the embodiment, a counter K is provided with the image forming apparatus 100. In the embodiment, as shown in part (a) of FIG. 9, a storing area (storing portion) for the counter K is provided with the memory 152. And the control portion 150 updates a value of the counter K based on the information of "the number of the image forming sheets" as the information about the use history of the photosensitive drum 1 and the information of "the time of the sheet interval process" as the information of the time of the first non-image-forming process. For example, the control portion 150 adds the value of the counter K at a timing when the recording material P (the first recording material P) is fed, and reflects the information of "the number of image forming sheets" as information about the use history of the photosensitive drum 1. Next, the control portion 150 subtracts the value of the counter K according to the time of the sheet interval process immediately after the image forming process of the recording material P (the first recording material P) and reflects the information of the time of the sheet interval process as the time of the first non-image-forming process. After that, the control portion 150 adds the value of the counter K again at the timing when the next recording material P (the second recording material P) is fed. And the control portion 150 determines the time of the sheet interval process or the post rotation process, which are the time of the second non-image-forming process immediately after the image forming process of the second recording material P according to the value of the counter K at that time.

In the embodiment, the value of the counter K is equivalent to the number of sheets of the recording materials P ("the number of continuous image forming sheets") which are conveyed continuously in the usual time of the sheet interval process (50 msec) without interposing the post rotation process or the sheet interval process in which the time is changed. And the greater the value of the counter K, the more water accumulated in the brush member 10, indicating that it is necessary to drive (rotate) the photosensitive drum 1 by the longer sheet interval process or the longer post rotation process in order to evaporate the water which is accumulated in the brush member 10.

Incidentally, in the embodiment, the control object is the driving time of the photosensitive drum 1 in the sheet interval process and the post rotation process, however, the control object is not limited to this and may be the number of rotations or the rotation distance of the photosensitive drum 1 in the sheet interval process or the post rotation process.

Example of Setting the Time of the Sheet Interval Process and the Post Rotation Process Next, an example of setting the time of the sheet interval process and the post rotation process according to the value of the counter K in the embodiment will be described. Table 1 shows a relationship between the value of the counter K and the time of the sheet interval process and the post rotation process in the embodiment.

TABLE 1

| | Counter K | | | | |
|---|---|---|---|---|---|
| | 5 | 4 | 3 | 2 | 1 |
| Time of sheet interval process | 30 sec | 0.05 sec* | 0.05 sec* | 0.05 sec* | 0.05 sec* |
| Time of post rotation process | 30 sec | 20 sec | 10 sec | 4 sec* | 4 sec* |

*without extension

First, the time of the sheet interval process will be described. In a configuration of the embodiment, when the recording material P in a high moisture absorption state after being left in a humid environment is used and, for example, continuous image forming of 30 sheets of the image forming sheets is performed, the water which is accumulated in the brush member 10 locally flows out onto the surface of the photosensitive drum 1 as shown in part (c) of FIG. 4 after approximately 25 sheets of the image forming sheets. And in that area, since a large amount of the water is adsorbed by the discharge products which are deposited on the surface of the photosensitive drum 1, the image deletion occurs.

Therefore, in order to prevent too much water from accumulating in the brush member 10 in the embodiment, the following is done. The value of the counter K is added by 1, for example, at the timing when the recording material P is supplied. And when the value of the counter K reaches 5, the extension of the sheet interval process is executed and the value of the counter K is subtracted by 5. Incidentally, in the embodiment, while image forming is executed in the usual time of the sheet interval process, the value of the counter K is subtracted by 0 (that is, not subtracted). Accordingly, the maximum number of the continuous image forming sheets in the usual time of the sheet interval process is controlled to be 5 sheets, and the sheet interval process for 30 seconds is executed for every 5 sheets of the continuous image forming sheets.

That is, in the embodiment, for example, a job of 50 sheets of the continuous image forming sheets is executed as follows. Incidentally, "=>" indicates a transition in an operation. First, five sheets of continuous image forming are executed, and the time of the sheet interval process is extended to 30 seconds. After that, procedures are executed as follows: five sheets of continuous image forming=> the time of the sheet interval process is extended to 30 seconds=> five sheets of continuous image forming => the time of the sheet interval process is extended to 30 seconds=> five sheets of continuous image forming=> the time of the sheet interval process is extended to 30 seconds=> five sheets of continuous image forming=> the time of the sheet interval process is extended to 30 seconds=> five sheets of continuous image forming.

According to the embodiment, it is possible to dry the water which is attached to the brush member 10 for five sheets of the continuous image forming sheets to a state of almost zero by an idle rotation of the photosensitive drum 1 for 30 seconds. Therefore, it is possible to maintain a state that the brush member 10 does not retain too much water, as shown in part (a) of FIG. 4 and part (b) of FIG. 4, and to suppress occurrence of image deletion by such an operation.

Next, the time of the post rotation process will be described. In the embodiment, the time of the post rotation process is set so that the smaller the value of the counter K, the shorter the time of the post rotation process, as shown in Table 1. This is because a following thing is true, for example, in a case that the post rotation process is initiated when the last continuous image forming sheets are three sheets or in a case that a job is that the image forming sheets are three sheets in the first place. That is, in such a case, the value of the counter K is three when the post rotation process is initiated. In this case, an idle rotation of the photosensitive drum 1 may be executed only enough to dry the water which is accumulated in the brush member 10 for three sheets of the continuous image forming sheets. That is, in such a case, the post rotation process may be completed in a shorter time of the post rotation process than in a case that the continuous image forming sheets are five sheets and the value of the counter K is five. In the embodiment, when the job is completed, putting it in a state that the water which is accumulated in the brush member 10 by image forming is not substantially remained, it will prepare for a next job.

As described above, in the embodiment, the time of the sheet interval process or the post rotation process which are executed next is determined based on information of "the number of the image forming sheets" and information of "the time of the sheet interval process". According to the embodiment, it is possible to control the amount of the water which is accumulated in the brush member 10 by continuous image forming and to prevent the water which is accumulated in the brush member 10 from overflowing. Therefore, according to the embodiment, it is possible to suppress the occurrence of the image deletion by the adsorption of the discharge products which are deposited on the surface of the photosensitive drum 1 and a large amount of the water.

Incidentally, a balance between the number of the image forming sheets and the time of the sheet interval process or the post rotation process depends on pile length L1 of the brush member 10, thickness of the pile yarn 11*a* and density of the pile yarn 11*a*. This is because the water retaining capacity of the brush member 10 depends on the pile length L1 of the brush member 10, the thickness of the pile yarn 11*a* and the density of the pile yarn 11*a*. That is, this is because the number of the continuous image forming sheets before the water which is accumulated in the brush member 10 locally flows out onto the surface of the photosensitive drum 1 may vary, and speed at which the water which is retained in the brush member 10 is little by little discharged onto the photosensitive drum 1 and evaporates may vary. Therefore, according to the configuration of the brush member 10, it is possible to change a relationship between the number of the image forming sheets and the time of the sheet interval process or the post rotation process, appropriately.

<Procedure for Setting the Time for the Sheet Interval Process and the Post Rotation Process>

Figure 6:
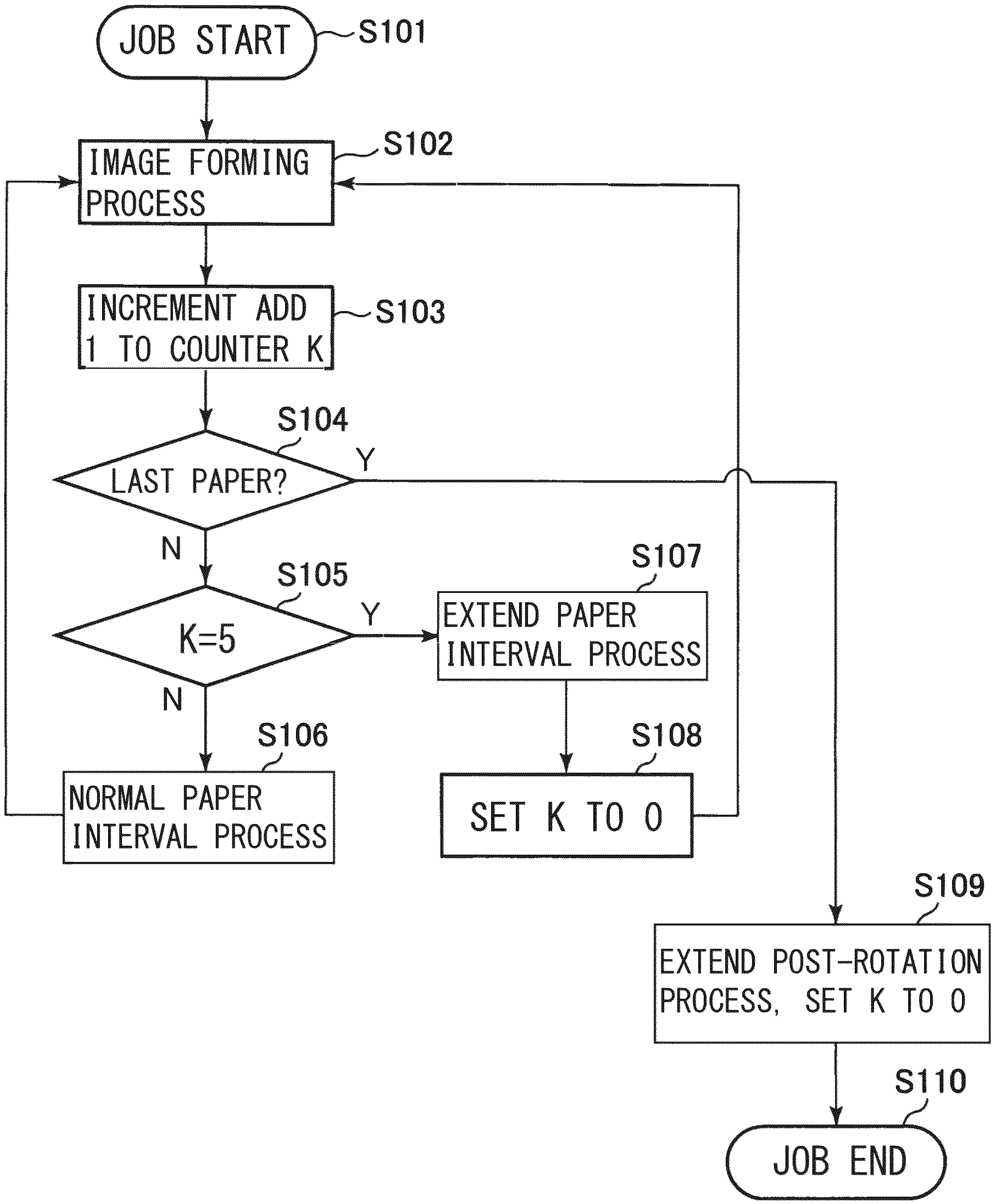
FIG. 6 is a flow chart of control according to a first embodiment.

FIG. 6 is a flowchart diagram outlining the procedure for a job that includes extension operations of the sheet interval process and the post rotation process in the embodiment.

S101: The control portion 150 obtains information about a job which is sent from an external device based on user's operation.

S102: The control portion 150 executes the image forming process.

S103: The control portion 150 adds one to the value of the counter K at a timing when the recording material P is fed.

S104 to S106: In S104, the control portion 150 determines whether a next image forming is a last image forming of a job or not, that is, whether the recording material P which is conveyed next is a last recording material P (here it is also referred to as "last paper") or not. Further, in S105, the control portion 150 determines whether the value of the counter K has reached five (that is, whether the value of the counter K is equal to five). And in a case that the control portion 150 determines that it is the last paper (Y in S104), it goes to the post rotation process (S109). Further, in a case that the control portion 150 determines that it is not the last sheet (N in S104) and the value of the counter K is not equal to five (less than five) (N in S105), it goes through the usual sheet interval process (S106) and goes to the next image forming process (S102). In the embodiment, the usual time of the sheet interval process is 50 msec.

S107: In a case that the control portion 150 determines that the value of the counter K is equal to five in S105 (Y in S105), an extension of the sheet interval process is executed (S107). In the embodiment, the extended time of the sheet interval process is 30 seconds (Table 1).

S108: When the control portion 150 executes the extension of the sheet interval process in S107, it resets the value of the counter K to zero, assuming that the water which is accumulated in the brush member 10 is almost zero. This is because it is possible to remove the water which is accumulated in the brush member 10 by discharging it little by little during the extension of the sheet interval process in $107. After that, the control portion 150 goes to the image forming process (S102) when the extension of the sheet interval process is completed.

S109: In a case that the control portion 150 determines that it is the last paper in S104 (Y in S104), the control portion 150 executes the post rotation process for the time corresponding to the current value of the counter K according to Table 1. Further, when the post rotation process is completed, the control portion 150 resets the value of the counter K to zero, assuming that the water which is accumulated in the brush member 10 is almost zero.

S110: The control portion 150 completes the job when the post rotation process is completed.

6. Effect

In order to confirm an effect of the embodiment, an experiment was conducted to examine an occurrence of the image deletion every 10 sheets when a job of 30 image forming sheets is executed by using the recording material P which absorbs moisture. The experiment was conducted in an environment of temperature 15° C./humidity 80% (low temperature and high humidity), in which the water tends to accumulate in the brush member 10 and the image deletion is likely to occur locally. The lower the temperature and the cooler the photosensitive drum 1 is, the more likely it is that moisture in the environment and water vapor from the recording material P which has passed through the fixing device 9 causes condensation and the water is accumulated in the brush member 10 since a large amount of the water is attached to the surface of the photosensitive drum 1. Further, in a humid environment, the amount of water vapor which comes out from the recording material P which has passed through the fixing device 9 also increases as the recording material P absorbs moisture. The recording material P which was used in the experiment was Xerox Vitality Multipurpose paper, Letter size, basis weight 75 g/m$^2$ and the recording material P was taken out from a wrapping paper and left in an environment of temperature 15° C./humidity 80% (low temperature and high humidity environment) for two days. A water content of the paper was 9.2% as measured with a Moistrex MX-8000 moisture meter which was manufactured by NDC Infrared Engineering. Further, for comparison, the water content of this paper was measured immediately after removing the wrapping paper and was 5.7%.

Similar experiments are conducted for comparative examples from 1 through 4. Incidentally, here, the photosensitive drum 1 is evaluated in a nearly new condition. Comparative example 1 is an example in a case that the sheet interval process is not extended in a configuration that the brush member 10 is not arranged. Comparative example 2 is an example in a case that the sheet interval process is extended in a configuration that the brush member 10 is not arranged. Comparative example 3 is an example in a case that a time of extending the sheet interval process ("an extended time") is furthermore added in a configuration that the brush member 10 is not arranged. Comparative example 4 is an example in a case that the sheet interval process is not extended in a configuration similar to the embodiment (the brush member 10 is arranged). Incidentally, the configuration and the operation of the image forming apparatus 100 according to the comparative examples from 1 through 4 are substantially the same as those of the image forming apparatus 100 according to the embodiment, except for the points which are described above.

Results are shown in Table 2. In Table 2, "o" indicates that the image deletion by attaching the water vapor onto the surface of the photosensitive drum 1 has not occurred, "Δ" indicates that the image deletion has occurred only slightly, and "x" indicates that the image deletion has occurred significantly.

TABLE 2

| | Brush | Sheet interval extension | 10 sheets | 20 sheets | 30 sheets |
|---|---|---|---|---|---|
| COMP. 1 | NO | NO EXTENSION | Δ | x | x |
| COMP. 2 | NO | YES EXTENSION (30 seconds for every five sheets) | ○ | Δ | x |
| COMP. 3 | NO | YES EXTENSION (90 seconds for every five sheets) | ○ | ○ | Δ |
| COMP. 4 | YES | NO EXTENSION | ○ | ○ | x locally |
| EMBD. 1 | YES | YES EXTENSION (30 seconds for every five sheets) | ○ | ○ | ○ |

In the comparative example 1, the image deletion began to occur slightly by continuous image forming of approximately ten image forming sheets. Furthermore, a level of the image deletion is degraded as the number of image forming sheets is increased. This is because, due to absence of the brush member 10, the water vapor which is attached onto the surface of the photosensitive drum 1 accumulates without being removed from the surface of the photosensitive drum 1 and the water significantly decreases the surface resistance of the photosensitive drum 1.

In the comparative example 2, the image deletion occurred slightly at 20 sheets of the image forming sheets. This indicates that in the configuration in which the brush member 10 is not mounted, 30 seconds of the time of the sheet interval process is insufficient to dry the water for five sheets of continuous image forming sheets.

Figure 8:
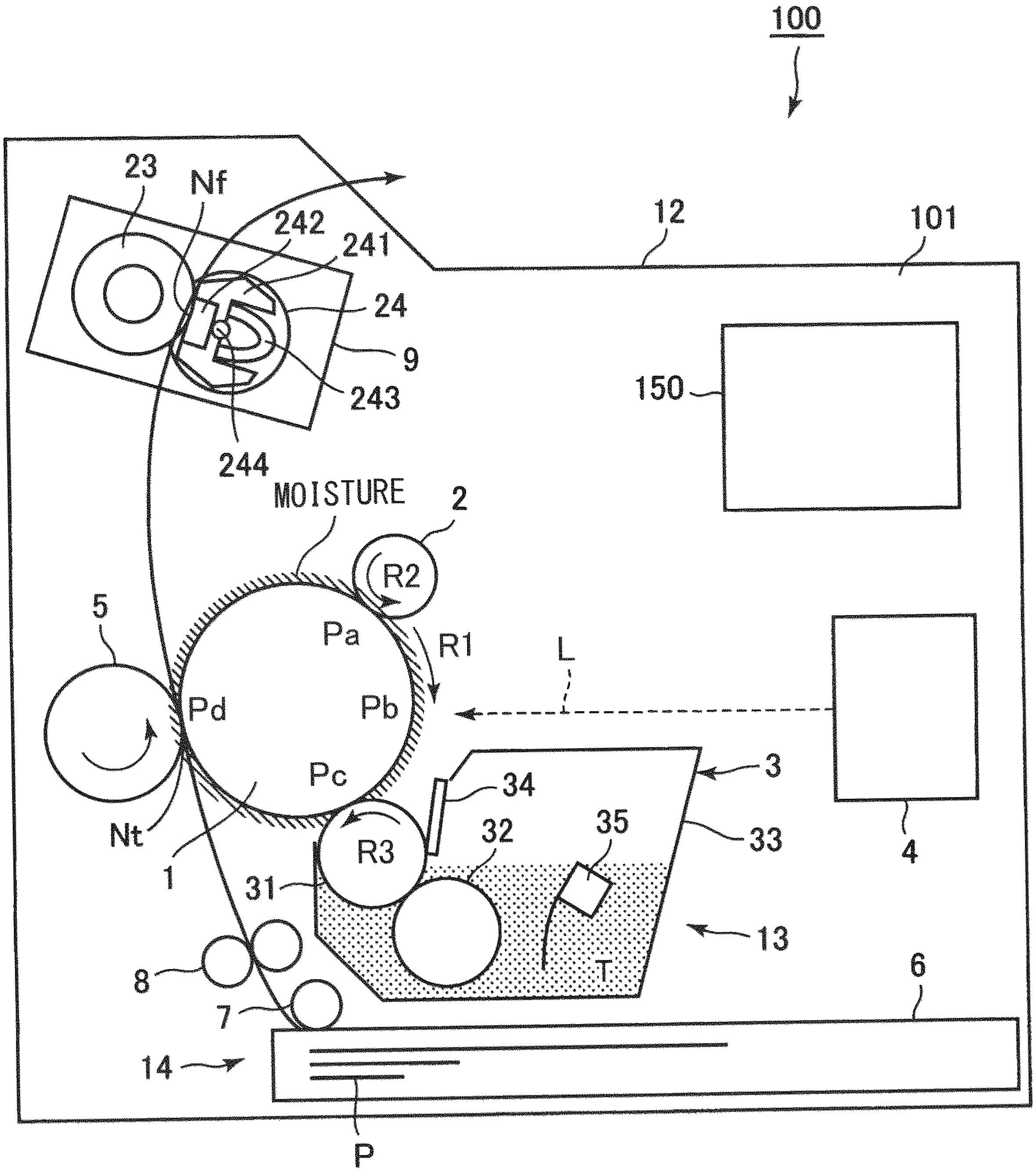
FIG. 8 is a schematic sectional view of the image forming apparatus according to a comparative example.

In the comparative example 3, by setting the time of the sheet interval process to 90 seconds, it is possible to suppress the image deletion until 20 sheets of image forming sheets; however, the image deletion has occurred slightly at 30 sheets of image forming sheets. This is considered to be due to a fact that in a configuration in which the brush member 10 is not mounted, the water which is accumulated on the surface of the photosensitive drum 1 exists in a thick layer on the photosensitive drum 1 as shown in FIG. 8. In this condition, since a specific surface area of the water which contacts the surrounding air is small compared to an amount of the water which exists on the surface of the photosensitive drum 1, it tends to take longer to dry.

In the comparative example 4, the image deletion does not occur until 20 sheets of the image forming sheets due to an effect of the brush member 10 in collecting the water vapor which is attached onto the surface of the photosensitive drum 1. However, since continuous image forming is continued without extending the sheet interval process, the water which is accumulated in the brush member 10 becomes too much from approximately 25 sheets of the image forming sheets, so localized areas in which the water is flowed out of the brush member 10 begin to occur, and the image deletion begins to occur in these areas.

In the embodiment, it is possible to suppress the occurrence of the image deletion by executing the extension of the sheet interval process in the configuration in which the brush member 10 is mounted. In contrast to the comparative example 2 and the comparative example 3, in the embodiment, it is possible to reset by drying the water for five sheets of the continuous image forming sheets which is collected in the brush member 10 to almost zero in 30 seconds of the sheet interval process. This is considered to be due to a fact that it is possible to increase the specific surface area in which the water which exists on the surface of the photosensitive drum 1 contacts surrounding air by gradually releasing the water which is once collected by the brush member 10 to the surface of the photosensitive drum 1 during the sheet interval process as shown in FIG. 5. That is, this is considered to be due to a fact that, by doing this, evaporation rates of the water are faster than the water which exists as a thick layer on the photosensitive drum 1 as shown in FIG. 8, in the configuration of the comparative example 2 and the comparative example 3. Further, in contrast to the comparative example 4, in the embodiment, it is possible to suppress the occurrence of the localized image deletion when the water is locally flowing out onto the surface of the photosensitive drum 1 by preventing too much water from accumulating in the brush member 10. This is due to a fact that the number of the continuous image forming sheets is limited to five sheets and the extension of the sheet interval process is executed.

Incidentally, the effect of the extension of the sheet interval process is described here, however, in the embodiment, the post rotation process after 30 sheets of the image forming process are completed is also extended to 30 seconds according to Table 1. Thus, it is possible to suppress the occurrence of the image deletion by the similar effect as the effect which is described above, even when a next job is executed immediately after the current job.

Thus, in the embodiment, the image forming apparatus 100 includes the rotatable photosensitive member 1, the charging member 2 which electrically charges the surface of the photosensitive member 1 at the charging portion Pa, the developing device supplying toner to the surface of the photosensitive member 1 electrically charged and configured to form the toner image, the transfer member 5 configured to transfer the toner image from the photosensitive member 1 to the recording material P at the transfer portion Pd, the brush member 10 contacting the surface of the photosensitive member 1 at downstream of the transfer portion Pd and upstream of the charging portion Pa with respect to a rotational direction of the photosensitive member 1 and configured to form a contacting portion Pe, the driving source 110 configured to rotatably drive the photosensitive member 1, and the control portion 150 configured to control the driving source 110 to execute the image forming process in which image formation to the recording material P is executed and the non-image-forming process in which the photosensitive member 1 is driven to rotate other than the image forming process, wherein the non-image-forming process between the first recording material P and the second recording material P to which the image formation is executed following the first recording material P is defined as a first non-image-forming process, and the non-image-forming process between the second recording material P and the third recording material P to which image formation is executed following the second recording material P is defined as a second non-image-forming process, and wherein the control portion 150 determines a time of the second non-image-forming process based on a history information correlating with a usage amount of the photosensitive member 1 and a time of the first non-image-forming process. Further, in the embodiment, the control portion 150 configured to control the driving source 110 to execute the image forming process in which the image formation to the recording material P is executed, the non-image-forming process in which the photosensitive member 1 is driven to rotate other than the image forming process, and the post rotation process in which the photosensitive member 1 is rotated without executing the image forming process after executing the image forming process, wherein the non-image-forming process between the first recording material P and the second recording material P on which the image formation is executed following the first recording material P is defined as the first non-image-forming process, and wherein the control portion 150 determines a time of the post rotation process to be executed after executing the image forming process to the second recording material P based on the history information correlating with the usage amount of the photosensitive member 1 and the time of the first non-image-forming process.

In the embodiment, the control portion 150 determines the time of the second non-image-forming process depending on a value which is controlled to be added according to the number of the sheets of the recording material P on which image forming is performed and to be subtracted when the driving operation of the photosensitive member 1 is executed during the non-image-forming process. Here, as will be described below, the control portion 150 is possible to control so that the time for the second non-image-forming process in a case that a second time in which a time for executing the continuous image forming is shorter than the first time is shorter than a first time which is a time for executing the continuous image forming, in a case that image forming is performed on the second recording material after performing continuous image forming in which images are formed continuously on the plurality of first recording material for the first non-image-forming process as a predetermined time. Further, in the embodiment, the control portion 150 determines the time of the post rotation process which is executed after the second recording material P depending on the value which is controlled to be added according to the number of the sheets of the recording material P on which image forming is performed and to be subtracted when the driving operation of the photosensitive member 1 is executed during the non-image-forming process. Here, the control portion 150 is possible to control so that the time for the post rotation process which is executed after the second recording material in the case that the second time in which the time for executing the continuous image forming is shorter than the first time is shorter than the first time which is the time for executing the continuous image forming in a case that continuous image forming which performs image forming continuously on the plurality of first recording materials as the time of the first non-image-forming process is defined as a predetermined time is performed and the post rotation process is performed after image forming on the second recording material P. Further, in the embodiment, toner which is remained on the surface of the photosensitive member 1 after transferring the toner image from the photosensitive member to the recording material P is removed from the surface of the photosensitive member 1 and collected by the developing device 3.

As explained above, according to the embodiment, it is possible to control the amount of the water which is accumulated in the brush member 10 by continuous image forming and to prevent the water which is accumulated in the brush member 10 from overflowing. Therefore, according to the embodiment, it is possible to form stable images by suppressing the occurrence of the image deletion which is caused by the discharge products which are deposited on the surface of the photosensitive drum 1 and the adsorption of a large amount of the water.

7. Modified Example

Incidentally, in the embodiment, the image forming apparatus 100 uses a DC charging method, however, the present invention is also applicable to an image forming apparatus which uses an AC charging method which applies an oscillating voltage which is superposed of a DC voltage (DC component) and an AC voltage (AC component) as a charging voltage.

Further, in the embodiment, only the DC component of the developing voltage is described, however, the developing voltage may be the oscillating voltage in which the DC voltage (DC component) and the AC voltage (AC component) are superposed.

Further, in the embodiment, the toner which is a non-magnetic single-component developer is used as a developer, however, a magnetic single-component developer may also be used.

Further, in the embodiment, a configuration in which only the brush member 10 is used as a means of cleaning the photosensitive drum 1 is applied, however, the present invention is not limited to such a configuration. For example, a cleaning blade as a cleaning means may be arranged downstream of the brush member 10 and upstream of the charging roller 2 with respect to the rotational direction of the photosensitive drum 1. In this way, the present invention is applicable to an image forming apparatus of "blade cleaning method" which uses the cleaning blade in addition to the brush member 10.

Incidentally, the brush member 10 may be connected to a brush power source (high voltage power source) E4 (FIG. 3) as a brush voltage application means (brush voltage application portion). And during the image forming process (during the cleaning process of the photosensitive drum 1), a predetermined brush voltage (brush bias), which is a DC voltage of negative polarity, may be applied to the brush member 10. The brush voltage is −300V as an example. Further, the brush voltage may be applied to the brush member 10 during non-image-forming process (for example, during the sheet interval process). A transfer residual toner which remains on the surface of the photosensitive drum 1 without being transferred to the recording material P is sent to the brush member 10 which is mounted downstream from the transfer roller 5 with respect to the rotational direction of the photosensitive drum 1. By setting the brush voltage as described above, it is possible to pass through a brush contact portion Pe without attaching the toner, which is charged with negative polarity which is a normal charge polarity which is contained in much of the transfer residual toner with respect to a potential of an image portion of the photosensitive drum 1, to the brush member 10. Therefore, it is possible to suppress an excessive accumulation of the toner on the brush member 10. Further, paper dust which is attached to the surface of the photosensitive drum 1 in the transfer portion Pd is also sent to the brush member 10. By setting the brush voltage as described above, it is possible to collect paper dust which is charged positively and attached to the surface of the photosensitive drum 1 with negative polarity mainly in the transfer portion Pd. Incidentally, paper dust is a paper based fibrous foreign matter in which pulp fibers in which cellulose is main component are derived from paper and fillers which are derived from paper may be included.

Further, in the embodiment, a pre-exposure unit may be provided to expose the surface of the photosensitive drum 1 downstream from the transfer portion Pd and upstream from the charging portion Pa with respect to the rotational direction of the photosensitive drum 1. The pre-exposure unit may be provided upstream or downstream from the contact portion Pe between the brush member 10 and the photosensitive drum 1. In a case that the pre-exposure unit is provided upstream from the contact portion Pe, the surface potential of the photosensitive drum 1 may be controlled by the pre-exposure unit.

Further, in the embodiment, the number of the sheets in which images can be formed continuously and the extended time of the non-image-forming process are set constant, however, the present invention is not limited to such a mode. For example, the number of the sheets in which images can be formed continuously and the time of the non-image-forming process may be variable, so that the fewer the number of the continuous image forming sheets, the shorter the extended time for the non-image-forming process immediately after the continuous image forming. In the embodiment, the control always extends the time for the sheet interval process after 5 sheets of continuous image forming are performed, in case more than 30 sheets of image forming are performed. Therefore, it may be an excessive control for a user who often executes a job in which the number of the image forming sheets is less than 20 sheets. However, in the embodiment, as a result of the comparative example 4 in Table 2 indicates, the image deletion does not occur when the number of the continuous image forming sheets is approximately 20 sheets. So, for example, a job in which the number of the image forming sheets is 30 sheets may be performed as follows.

In a configuration according to the embodiment, when up to 20 sheets of continuous image forming is performed, a rotating time of the photosensitive drum 1 which is required to evaporate the water which is accumulated in the brush member 10 is shown in Table 3.

TABLE 3

| Number of sheets | | | | | | |
|---|---|---|---|---|---|---|
| 20-16 | 15-11 | 10-6 | 5 | 4 | 3 | 2-1 |
| 60 sec | 50 sec | 40 sec | 30 sec | 20 sec | 10 sec | 4 sec* |

(*no extension)

Therefore, continuous image forming is performed by 20 sheets, and the time for the sheet interval process immediately after this is extended to 60 seconds which is necessary to evaporate the water which is accumulated in the brush member 10 for the 20 sheets. After that, the remaining 10 sheets may be continuously image formed, and the post rotation process may be extended to 40 seconds.

Furthermore, for example, the time of the sheet interval process may be set to 45 seconds immediately after up to 20 sheets of the continuous image forming, since it is assumed that 60 seconds of the extended time of the sheet interval process is too long. In the case, since the water which is accumulated in the brush is not completely evaporated even after the sheet interval process is extended, and when 20 sheets of the continuous image forming are performed again, the slight image deletion occurs after eight sheets of the continuous image forming sheets. Therefore, in the case, after 45 seconds of the extended time of the paper interval process, seven sheets of continuous image forming are performed, the time of the sheet interval process immediately after this is extended to 35 seconds, and finally the remaining three sheets of continuous image forming are performed and the time of the post rotation process is extended to 20 seconds. In this manner, by balancing the number of the continuous image forming sheets, the time of the extended interval sheet process and the time of the extended post rotation process, it is sufficient to control so that the water which is accumulated in the brush member 10 does not become too much. Control is possible to perform by using a counter as in the embodiment. Alternatively, the number of the continuous image forming sheets, the extended time of the sheet interval process and the extended time of the post rotation process from a job start may be found based on results of experiments under severe conditions in advance, and it may also be controlled by controlling to operate according to these conditions. Thereby, since it is possible to suppress a phenomenon that the water which is accumulated in the brush member 10 is locally flowing out onto the surface of the photosensitive drum 1, it is possible to suppress the occurrence of the image deletion. Furthermore, for example, a job of 50 sheets of the image forming sheets may be performed as follows. The time of the sheet interval process is extended to 45 seconds after 20 sheets of continuous image forming. After that, the time of the sheet interval process is extended to 35 seconds after 7 sheets of continuous image forming. After that, the time of the sheet interval process is extended to 20 seconds after 3 sheets of continuous image forming. Then, in a case that the water which is accumulated in the brush member 10 is almost zero at this point, 20 sheets of the continuous image forming are performed again. Finally, when the time of the post rotation process is extended to 60 seconds, the water which is accumulated in the brush member 10 is reset to almost zero, and the job is finished. By such an operation, it is possible to improve a usability (productivity).

Further, in the embodiment, the extension of the post rotation process is configured to reduce the water which is accumulated in the brush member 10 by continuous image forming to almost zero, however, the present invention is not limited to such a configuration. It may be sufficient that the water which is accumulated in the brush member 10 is removed by the time when the next job is started. For example, even in a case that the number of the continuous image forming sheets is so large that the extension of the post rotation process is not sufficient to remove the water which is accumulated in the brush member 10, the water may be removed by performing extension of the pre rotation process of the next job. Further, it is also assumed that the water which is accumulated in the brush member 10 may evaporate by natural drying. Therefore, for example, when a job is started, according to an elapsed time from the previous job, the longer the elapsed time from the previous job, the shorter the extended time of the pre rotation process or the post rotation process may be.

Further, a parameter to which the value of the counter K is added is not limited to the one in the present embodiment. The parameter may be a parameter which correlates with a phenomenon in which the water is accumulated in the brush member 10. For this parameter, for example, the number of the continuous image forming sheets in the usual time of the sheet interval process, as well as a total time of the image forming process when images are formed continuously in a condition of the usual time of the sheet interval process, etc. may be used. Further, the image deletion is a phenomenon of the water vapor which is generated when the recording material P passes through the fixing device 9. Therefore, this parameter may be, for example, the total time that the recording material P passes through the fixing device 9 when image forming is continuously performed in the condition of the usual time of the sheet interval process. Incidentally, as described above, the number of the sheets and the time, as well as the number of rotations or the rotation distance, etc. may be used.

Further, a parameter for subtracting the value of the counter K is not limited to the one in the present embodiment. The parameter may be a parameter which correlates with a phenomenon in which the water which is accumulated in the brush member 10 is dried while it is discharged little by little onto the surface of the photosensitive drum 1. For this parameter, for example, a time that a drive (rotation) of the photosensitive drum 1 is executed except the image forming process, that is, a time of the non-image-forming process, as well as a time when the recording material P does not pass through the fixing device 9 and a time when the drive (rotation) of the photosensitive drum 1 is executed, etc., may be used. Incidentally, as described above, the number of the sheets and the time, as well as the number of rotations or the rotation distance, etc. may be used.

Further, in the embodiment, addition and subtraction of the value of the counter K is configured that the value of the counter K is updated at a timing which is shown in the flowchart diagram in FIG. 6, however, the present invention is not limited to such a configuration. For example, in a configuration in which the value of the counter K is updated every 100 msec, the value may be added when updating is during the image forming process and subtracted when updating is during the non-image-forming process. Further, for example, the subtracting value may be changed depending on whether it is the sheet interval process or the post rotation process during the non-image-forming process. Furthermore, for example, the value of adding to and subtracting from the value of the counter K may be adjusted based on information such as an attenuation condition of the surface potential of the photosensitive drum 1, temperature transition and humidity transition inside the image forming apparatus 100, a use environment of the image forming apparatus 100, moisture absorption degree and size of the recording material P which is used, the temperature change of the fixing device 9, etc.

Further, in the embodiment, the necessary extension times of the sheet interval process and the post rotation process are set by determining in advance the extension time which may be necessary according to the number of the continuous image forming sheets, however, the present invention is not limited to such a mode. For example, it may be configured that the necessary extension times are estimated based on information such as the attenuation condition of the surface potential of the photosensitive drum 1, the temperature transition and the humidity transition inside the image forming apparatus 100, the use environment of the image forming apparatus 100, the moisture absorption degree and the size of the recording material P which is used, the temperature change of the fixing device 9, etc.

Further, in the embodiment, as shown in Table 1, the necessary times of the sheet interval process and the post rotation process are stored as a table in the memory 152, however, the present invention is not limited to such a mode. For example, the value which is stored in the table may be only the time of the extension ("extended time") relative to the usual times of the sheet interval process and the post rotation process. Further, for example, the value which is stored in the table may be a ratio of the time of the extension relative to the usual time of the sheet interval process and the usual time of the post rotation process. Further, it may be configured that coefficients according to the number of the image forming sheets and the stopped time are stored without preparing the table, and the time of the sheet interval process and the time of the post rotation process (or the extended time) are calculated.

That is, the image forming apparatus 100 includes the control portion 150, which controls a time of non-image-formation, which is a time when the photosensitive member 1 is rotating in a period from when the preceding recording material P passes through the transfer portion Pd until the succeeding recording material P reaches the transfer portion Pd, and the control portion 150, where, in an inter-image time, which is a time of non-image-formation from when the preceding recording material P passes through the transfer portion Pd until the succeeding recording material P reaches the transfer portion Pd without stopping rotation of the photosensitive member 1, is defined as a predetermined inter-image time, controls to change the time of the non-image-formation from when a last recording material in consecutive image formation, in which the toner image is consecutively transferred to the plurality of recording materials P, passes through the transfer portion Pd until the succeeding recording material P succeeding the last recording material P reaches the transfer portion Pd based on history information correlating with a usage amount of the photosensitive member 1 during the consecutive image formation.

Next, another embodiment of the present invention will be described. The embodiment will be described in a configuration in which the maximum number of the continuous image forming sheets is 20 sheets as mentioned in the item of "7. Modified example" of the first embodiment. Incidentally, a basic configuration and an operation of the image forming apparatus is same as that of the first embodiment. Accordingly, in the image forming apparatus according to the embodiment, elements having same or corresponding functions or configurations as those in the image forming apparatus according to the first embodiment will be attached with same reference numerals as the first embodiment and detailed descriptions will be omitted.

1. Overview of the Embodiment

In the embodiment, as in the first embodiment, the water which is accumulated in the brush member 10 is removed by extending the sheet interval process. And, in the embodiment, in addition to this, when a moving speed (conveying speed) of the recording material P is made faster than a moving speed (peripheral speed) of the surface of the photosensitive drum 1, the discharge products are removed from the surface of the photosensitive drum 1 by sliding the surface of the photosensitive drum 1 with the recording material P.

The image deletion is generated due to the discharge products which are deposited on the surface of the photosensitive drum 1 by electrical discharge which occurs between the charging roller 2 and the photosensitive drum 1 and the water vapor which is generated when the recording material P which absorbs moisture passes through the fixing device 9. That is, the image deletion occurs because the surface resistance of the photosensitive drum 1 is significantly reduced when the discharge products, which are described above, adsorbs the water vapor, which is described above. The more the total number of the image forming sheets of the photosensitive drum 1 (image forming apparatus 100) increases, the more discharge products are deposited on the surface of the photosensitive drum 1 and the more likely image deletion occurs even with a small amount of the water. For example, in a configuration of the embodiment, for a new photosensitive drum 1, the image deletion begins to occur after approximately 25 sheets of the image forming sheets of the continuous image forming. However, in the configuration of the embodiment, for the photosensitive drum 1 which is used for more than 10,000 sheets of image forming, the image deletion begins to occur even after approximately 15 sheets of the image forming sheets of the continuous image forming. This may be due to the following reasons. That is, the photosensitive drum 1 which is used to form images for more than 10,000 sheets is in a state that a large amount of discharge products are deposited on its surface. Therefore, in this state of the photosensitive drum 1, even with regard to the water which the brush member 10 discharges little by little onto the surface of the photosensitive drum 1, as shown in part (b) of FIG. 4, the surface resistance of the photosensitive drum 1 is reduced.

Therefore, in the embodiment, the extension of the time of the sheet interval process as a time of a second non-image-forming process is executed for purposes of not only removing the water from the brush member 10 but also reducing the amount of discharge products which are deposited on the surface of the photosensitive drum 1.

In the embodiment, the image forming apparatus 100 is configured of one motor, and both the photosensitive drum 1 and the pressing roller 23 of the fixing device 9 are driven by a single driving motor (main motor) 110. Further, in the embodiment, during the image forming process, respective driving speeds (rotational speeds of rotational axis) of the photosensitive drum 1 and the pressing roller 23 by the driving motor 110 are substantially constant. Therefore, in the embodiment, when the peripheral speed of the pressing roller 23 increases due to thermal expansion of the pressing roller 23 and increase of an outer diameter of the pressing roller 23, the conveying speed of the recording material P by the pressing roller 23 changes, and the moving speed of the recording material P changes relative to the moving speed of the surface of the photosensitive drum 1.

And in the embodiment, the thermal expansion of the pressing roller 23 is promoted by extending the time of the sheet interval process, and the surface of the photosensitive drum 1 is slid with the recording material P by increasing a difference between the moving speed of the recording material P and the moving speed of the surface of the photosensitive drum 1. This sliding by the recording material P reduces the discharge products which are deposited on the surface of photosensitive drum 1.

In this way, in the embodiment, in addition to the removal of the water from the brush member 10 which is described in the first embodiment, the discharge products which are deposited on the surface of the photosensitive drum 1 are also removed. Thus, in the embodiment, it is possible to suppress the occurrence of the image deletion throughout a lifetime of the photosensitive drum 1. In the following, further details will be described.

2. Relative Moving Speed of Recording Material with Respect to Photosensitive Drum In the embodiment, the conveying speed of the recording material P by the pressing roller 23 is set to be same as or lower than the moving speed of the surface of the photosensitive drum 1, for example, in a job in which the number of the image forming sheets from a cold state is a few sheets. This is because by taking the lifetime of the photosensitive drum 1 into consideration, when the difference between the moving speed of the surface of the photosensitive drum 1 and the moving speed of the recording material P is as small as possible, the surface of the photosensitive drum 1 is not scraped too much. Incidentally, the cold state is a state in which the image forming apparatus 100 is left without being driven and an atmosphere inside the main assembly 101 is not heated. However, when the conveying speed of the recording material P by the pressing roller 23 is set too slow relative to the moving speed of the surface of the photosensitive drum 1, a loop which is created between the transfer nip portion Nt and the fixing nip portion Nf may become too large and the conveying of the recording material P may become unstable. Considering what is described above, it is preferable that the conveying speed of the recording material P by the pressing roller 23 is set to remain between −2% (the conveying speed of the recording material P is slower) and 1.5% (the conveying speed of the recording material P is faster) with respect to the moving speed of the surface of the photosensitive drum 1. In the embodiment, in a case that the number of the continuous image forming sheets from the cold state is up to 20 sheets, the conveying speed of the recording material P by the pressing roller 23 is set to remain in a range from −0.2% to −0.1% with respect to the moving speed of the surface of the photosensitive drum 1. Further, for example, in a case that the number of the continuous image forming sheets is more than 100 sheets, the conveying speed of the recording material P by the pressing roller 23 becomes saturated in a state that the conveying speed of the recording material P is approximately 0.2% faster than the moving speed of the surface of the photosensitive drum 1. During continuous image forming, since the recording material P continuously removes heat from the pressing roller 23, the thermal expansion of the pressing roller 23 becomes saturated, and the conveying speed of the recording material P by the pressing roller 23 does not increase any further.

Incidentally, since the recording material P is conveyed by the photosensitive drum 1 from entering the transfer nip portion Nt until entering the fixing nip portion Nf, the moving speed of the surface of the photosensitive drum 1 is same as that of the recording material P. Next, in a case that the conveying speed of the recording material P by the pressing roller 23 is slower than the conveying speed of the recording material P by the photosensitive drum 1, when the recording material P enters the fixing nip portion Nf, the recording material P is conveyed while making a loop between the transfer nip portion Nt and the fixing nip portion Nf. Therefore, the moving speed of the surface of the photosensitive drum 1 is same as the moving speed of the recording material P. On the other hand, in a case that the conveying speed of the recording material P by the pressing roller 23 is faster than the conveying speed of the recording material P by the photosensitive drum 1, the moving speed of the recording material P follows the conveying speed of the recording material P by the pressing roller 23. That is, the moving speed of the recording material P is faster than the moving speed of the surface of the photosensitive drum 1, and there is a difference between the moving speed of the surface of the photosensitive drum 1 and the moving speed of the recording material P.

3. Extension operation of sheet interval process

In the embodiment, when the photosensitive drum 1, etc., is idly rotated at 120° C. of the temperature control temperature of the fixing device 9 in a case that the sheet interval process is extended, the conveying speed of the recording material P by the pressing roller 23 increases to approximately 0.6% with respect to the moving speed of the photosensitive drum 1. By the difference between the moving speed of the recording material P and the moving speed of the surface of the photosensitive drum 1, the recording material P slides on the surface of the photosensitive drum 1, so it is possible to remove the discharge products which are deposited on the surface of the photosensitive drum 1.

In this way, by removing the discharge products which are deposited on the surface of the photosensitive drum 1, it is possible to suppress becoming a situation that the image deletion easily occurs even with a small amount of the water as the total number of the image forming sheets of the photosensitive drum 1 (the image forming apparatus 100) increases. Thus, it is possible to suppress the occurrence of the image deletion throughout the lifetime of the photosensitive drum 1.

Specifically, in the embodiment, the image forming apparatus 100 is provided with the counter K which represents the amount of the water which is accumulated in the brush member 10 which is similar to that in the first embodiment and a counter M which represents the amount of the discharge products which are deposited on the surface of the photosensitive drum 1. In the embodiment, as shown in part (b) of FIG. 9, the memory 152 is provided with a storing area (storing portion) of the counter K and a storing area (storing portion) of counter M.

Table 4 shows a relationship between the value of the counter K and the time of the sheet interval process in the embodiment. Incidentally, Table 4 also shows a relationship between the value of the counter K and the time of the post rotation process in the embodiment. Details of the time of the post rotation process will be described below.

TABLE 4

| | Counter K | | | | | | |
|---|---|---|---|---|---|---|---|
| | 20-16 | 15-11 | 10-6 | 5 | 4 | 3 | 2-1 |
| Time of sheet interval process | 45 sec | 40 sec | 35 sec | 30 sec | 20 sec | 20 sec | 20 sec |
| Time of post rotation process | 60 sec | 50 sec | 40 sec | 30 sec | 20 sec | 10 sec | 4 sec* |

(*no extension)

First, the counter K will be described. The value of the counter K represents the amount of the water which is accumulated in the brush member 10, as in the first embodiment. The greater the value of the counter K, the greater the amount of the water which is accumulated in the brush member 10. In the embodiment, in order to prevent too much water from accumulating in the brush member 10, the greater the value of the counter K, the longer the time of the sheet interval process is extended. In the embodiment, for simplicity, the value of the counter K is reset to 0 after the extension of the time of the sheet interval process is executed under a condition in Table 4. In the first embodiment, it is described that the necessary extension time of the sheet interval process after 20 sheets of the continuous image forming is 60 seconds, and that the water which is accumulated in the brush member 10 is not completely removed in 45 seconds. Therefore, it may be true that the value of the counter K should not be reset to 0, however, in the embodiment, there are more opportunities for the sheet interval process to be extended by the counter M, which will be described later, than in the first embodiment, so it is not a problem to reset the counter K. Incidentally, the counter K may reflect 15 seconds, which is 15 seconds short of the originally required sheet interval extension time of 60 seconds after 20 consecutive images are formed. For example, after a 45 second extension of the sheet interval process, the counter K is set from 3 to 4.

In a configuration of the embodiment, for example, when the continuous image forming of 30 sheets of the image forming sheets is performed by using the recording material P in a high moisture absorption state after being left in a humid environment, the water which is accumulated in the brush member 10 locally flows out onto the surface of the photosensitive drum 1, as shown in part (c) of FIG. 4, at approximately 25 sheets. And in the portion, when a large amount of the water is adsorbed by the discharge products which are deposited on the surface of the photosensitive drum 1, the image deletion occurs.

Therefore, in the embodiment, in order to prevent too much water from accumulating in the brush member 10, following are performed. The value of the counter K is, for example, added by 1 at a timing when the recording material P is supplied, when the value of the counter K reaches 20, the extension of the sheet interval process is executed, and after that the value of the counter K is reset to 0. In this way, it is controlled so that the maximum number of the continuous image forming sheets during the usual time of the sheet interval process is 20 sheets, and the time of the sheet interval process, immediately after the image forming process in 20 sheets of the continuous image forming sheets, is extended. As a result, it is possible to suppress the occurrence of the local image deletion because it is possible to suppress too much water which is accumulated in the brush member 10 and to suppress the local overflow of the water which is accumulated in the brush member 10 onto the surface of the photosensitive drum 1. In the embodiment, the time of the sheet interval process after 20 sheets of the continuous image forming is set to 45 seconds.

Next, the counter M will be described. The value of the counter M represents the amount of the discharge products which are deposited on the surface of the photosensitive drum 1. The greater the value of the counter M, the greater the amount of the discharge products which are deposited on the photosensitive drum 1. The amount of the discharge products which are deposited on the surface of the photosensitive drum 1 gradually increases while the photosensitive drum 1 is charged by the charging roller 2, that is, during the image forming process. Therefore, the amount of the discharge products which are deposited on the surface of the photosensitive drum 1 correlates with the time of each image forming process, such as a time of charging voltage application to the photosensitive drum 1 and an exposure time, and the number of the image forming sheets. In the embodiment, for example, the value of the counter M is added at the timing when the recording material P is conveyed. On the other hand, the discharge products which are deposited on the surface of the photosensitive drum 1 may be largely removed by image forming immediately after the sheet interval process is extended. This is because, as described above, in a case that the sheet interval process is extended and the conveying speed of the recording material P by the pressing roller 23 is faster than the moving speed of the surface of the photosensitive drum 1, the recording material P slides on the surface of the photosensitive drum 1 and it is possible to remove the discharge products which are deposited on the surface of the photosensitive drum 1. Therefore, in the embodiment, the value of the counter M is subtracted in a case that the image forming process is performed after the extension of the sheet interval process is executed. That is, the value of the counter M can be subtracted in a case that an extension of the sheet interval process is performed. On the other hand, in a case that the extension of the post rotation process is executed, as will be described below, the value of the counter M cannot be subtracted because there is no process in which the recording material P slides on the photosensitive drum 1 and the discharge products on the surface of the photosensitive drum 1 are not removed. In this way, the counter M differs from the counter K in conditions in which the value can be subtracted. For the counter M, the post rotation process is not a control object.

In the configuration of the embodiment, for example, when the continuous image forming of 20 sheets of the image forming sheets is performed by using the recording material P in the high moisture absorption state after being left in the humid environment as described above, the image deletion does not occur in a case that the photosensitive drum 1 is in a new condition. However, in a case that the photosensitive drum 1 is in a condition that a large amount of the discharge products are deposited on its surface by being used for forming images of more than 10,000 sheets, the surface resistance of the photosensitive drum 1 decreases even with a small amount of the water in which the brush member 10 discharges little by little onto the surface of the photosensitive drum 1 as shown in part (b) of FIG. 4. And the image deletion begins to occur even with the continuous image forming of approximately 15 sheets of the image forming sheets.

In the embodiment, the sheet interval process which is more than 20 seconds each time for one sheet of image forming is periodically performed, in order to prevent too much discharge products from being deposited on the surface of the photosensitive drum 1. It is possible to thermally expand the outer diameter of the pressing roller 23 by the sheet interval process for more than 20 seconds, and it is possible to remove the discharge products by sliding the surface of the photosensitive drum 1 by the recording material P which moves approximately 0.6% faster than the moving speed of the surface of the photosensitive drum 1.

In the embodiment, the process to execute the sheet interval process which is more than 20 seconds each time for one sheet of image forming is defined as “discharge product removing mode”, and it is executed as follows.

The value of the counter M is, for example, added by 1 at a timing when the recording material P is supplied, when the value of the counter M reaches 26, the extension of the sheet interval process is executed after the image forming process for each image forming sheet. At this time, the value of the counter M is subtracted by 4 for each one sheet of image forming and each extension of the sheet interval process for 20 seconds or more. This is repeated until the counter M reaches 0. Becoming 0 of the value of the counter M means that the discharge products on the surface of the photosensitive drum 1 have been sufficiently removed.

Incidentally, in a range of 20 seconds or more for the sheet interval process, the thermal expansion of the pressing roller 23 is saturated, and an ability of the recording material P to remove the discharge products from the surface of the photosensitive drum 1 is almost constant. Therefore, in a case of executing the extension of the sheet interval process to 20 seconds or more, the value of the counter M is uniformly subtracted by 4, regardless of the length of the sheet interval time.

In the embodiment, the time of the sheet interval process is set to be extended uniformly to 20 seconds during the discharge product removing mode. Incidentally, the extension of this sheet interval process may include a purpose of removing the water which is accumulated in the brush member 10, and the value of the counter K may also be reduced.

When the values of the counter K and the counter M become 0 in the discharge product removing mode, it may be judged that the amount of the water which is accumulated in the brush member 10 and the discharge products on the surface of the photosensitive drum 1 are almost removed, and is canceled, and the continuous image forming is possible under a condition of the usual time (50 msec) of the sheet interval process by cancelling the extension of the paper interval process after each image forming process. Therefore, the control object of the counter M is a time of the second non-image-forming process, excluding the post rotation process which is executed after the second recording material P, that is "a time of the sheet interval process which is executed after the second recording material P". Further, "the number of times the time of the second non-image-forming process is extended" is also the control object of the counter M.

That is, in the embodiment, for example, a job of 50 sheets of the continuous image forming sheets is executed as follows. Incidentally, "=>" indicates a transition in an operation. 20 sheets of the continuous image forming (the counter K is 20, the counter M is 20)=> The counter K reaches 20 and the sheet interval process is extended to 45 seconds (the counter K is 0, the counter M is 16). =>10 sheets of the continuous image forming (the counter K is 10, the counter M is 26)=> The counter M reaches 26 and the sheet interval process is extended to 35 seconds, and enter the discharge product removing mode (the counter K is 0, the counter M is 22). => One sheet of image forming (since it is in the discharge product removing mode, the extension of the sheet interval process is executed for each sheet) (the counter K is 1, the counter M is 23)=> The sheet interval process is extended to 20 seconds (the counter K is 0, the counter M is 19). => One sheet of image forming (the counter K is 1, the counter M is 20)=> The sheet interval process is extended to 20 seconds (the counter K is 0, the counter M is 16). => One sheet of image forming (the counter K is 1, the counter M is 17)=> The sheet interval process is extended to 20 seconds (the counter K is 0, the counter M is 13). => One sheet of image forming (the counter K is 1, the counter M is 14)=> The sheet interval process is extended to 20 seconds (the counter K is 0, the counter M is 10). => One sheet of image forming (the counter K is 1, the counter M is 11)=> The sheet interval process is extended to 20 seconds (the counter K is 0, the counter M is 7). => One sheet of image forming (the counter K is 1, the counter M is 8)=> The sheet interval process is extended to 20 seconds (the counter K is 0, the counter M is 4). => One sheet of image forming (the counter K is 1, the counter M is 5)=> The sheet interval process is extended to 20 seconds (the counter K is 0, the counter M is 1). => One sheet of image forming (the counter K is 1, the counter M is 2)=> The sheet interval process is extended to 20 seconds (the counter K is 0, the counter M is 0). => Since the counter M becomes 0, the discharge product removing mode is cancelled. =>12 sheets of continuous image forming (the counter K is 12, the counter M is 12), image forming is performed in such a way.

In the embodiment, the counter K controls the amount of the water which is accumulated on the brush member 10 so that it does not become too much, and at the same time, the counter M controls the amount of the discharge products which are deposited on the surface of the photosensitive drum 1 so that it does not become too much. When the value of the counter M becomes great, it is determined that the amount of discharge products is increased, and as the discharge product removing mode, the thermal expansion of the press roller 23 is promoted by frequently extending the sheet interval process. In this way, the moving speed of the recording material P is made to be faster relative to the moving speed of the surface of the photosensitive drum 1, so that the recording material P is able to remove the discharge products on the surface of the photosensitive drum 1. Therefore, in the embodiment, it is possible to keep the discharge products on the surface of the photosensitive drum 1 from becoming too much throughout the lifetime of the photosensitive drum 1, and it is possible to suppress the occurrence of the image deletion throughout the lifetime of the photosensitive drum 1.

Incidentally, in the embodiment, the extension of the sheet interval process is executed for each image forming process in the discharge product removing mode, however, the present invention is not limited to such a mode. In the embodiment, it is sufficient that the recording material P is possible to remove the discharge products on the surface of the photosensitive drum 1 by using the thermal expansion of the pressing roller 23. For example, the extension of the sheet interval process may be executed for every two sheets of the image forming sheets. Further, in this case, an amount of subtraction of the value of the counter M may be as follows. That is, the amount of the discharge products which can be removed during a second sheet of the image forming process after the extension of the sheet interval process, is considered to be smaller than the amount of the discharge products which can be removed during a first sheet of the image forming process after the extension of the sheet interval process, since the temperature of the pressing roller 23 decreases. Therefore, the amount of subtraction of the value of the counter M by the second sheet of the image forming process may be adjusted to be smaller than the subtraction of the value of counter M by the first sheet of the image forming process.

Further, in the embodiment, the time of the sheet interval process in the discharge product removing mode is limited to 20 seconds or more. This is because the time is limited to the time of the sheet interval process when it is possible to saturate the thermal expansion of the pressing roller 23 in order to execute the image forming process after becoming a state that the moving speed of the recording material P is approximately 0.6% faster than the moving speed of the surface of the photosensitive drum 1. However, the present invention is not limited to such a mode. In the embodiment, it is required that the moving speed of the recording material P is faster than the moving speed of the surface of the photosensitive drum 1 by the thermal expansion of the pressing roller 23. For example, the time of the sheet interval process in the discharge product removing mode may be 10 seconds. Further, in that case, the amount of subtraction of the value of the counter M may be as follows. That is, a removing ability of the discharge products by the first sheet of the image forming process in a case that the time of the sheet interval process is 10 seconds is considered to be lower than that in a case that the time of the sheet interval process is 20 seconds or more. Therefore, the amount of subtraction in the case that the time of the sheet interval process is 10 seconds may be adjusted to be smaller than the amount of subtraction in the case that the time of the sheet interval process is 20 seconds or more.

4. Operation of Extension in the Post Rotation Process

In the embodiment, the time of the post rotation process is set according to the value of the counter K which represents the amount of the water which is accumulated in the brush member 10, similar to the first embodiment. In Table 4 which is described above, a relationship between the value of the counter K and the time of the post rotation process in the embodiment is described.

In the embodiment, a maximum value of the counter K is 20 which is a same meaning as the number of the continuous images forming sheets in the usual time of the sheet interval process (50 msec). It is ideal that the post rotation process is extended until becoming a state that the water which is accumulated in the brush member 10 does not substantially exist due to continuous image forming and it prepares for a next job. Therefore, in the embodiment, the greater the number of the continuous image forming sheets immediately before the job is finished, the longer the time of the post rotation process is set. For example, in a case that the job is finished after 20 sheets of the continuous image forming are performed finally, a 60 second of the post rotation process is performed, the photosensitive drum 1 is rotated idly, the water which is accumulated in the brush member 10 is removed, and then the idle rotation of the photosensitive drum 1 is finished. In a case of the sheet interval process, it is possible to reset the value of the counter K to 0 by 45 seconds of the idle rotation of the photosensitive drum 1 (it is possible to reset the water which is accumulated in the brush member 10 due to image forming to a state of almost zero). However, in the case of the post rotation process, 60 seconds of the idle rotation of the photosensitive drum 1 is required to reset the value of the counter K to 0 (to reset the water which is accumulated in the brush member 10 due to image forming to a state of almost zero). This may be due to a difference between the temperature control temperature 120° C. of the fixing device 9 during extending the sheet interval process and the temperature control temperature (heater OFF) during the post rotation process. When the idle rotation of the photosensitive drum 1 is extended while the temperature control temperature is high, since the temperature inside the main assembly 101 rises and a relative humidity falls, the water vapor which is attached onto the surface of the photosensitive drum 1 and the water which is accumulated on the brush member 10 evaporate more easily. Further, in a case that the value of the counter K is from 1 to 2, that is, after from 1 to 2 sheets of the continuous image forming, since the water which is accumulated in the brush member 10 is small, the post rotation process does not need to be extended and is finished in the usual post rotation process.

On the other hand, the value of the counter M is not updated even when the post rotation process is extended. This is because the discharge products are little by little removed by the sliding of the developing roller, the charging roller and the transfer roller; however, regarding the discharge products on the surface of the photosensitive drum 1 which the value of the counter M represents, a balance between generation and removal of the discharge products does not change in a case that the recording material P is not conveyed after the extension of the sheet interval process. As described above, in the embodiment, the configuration is that the discharge products on the surface of the photosensitive drum 1 are removed by the recording material P, when the conveying speed of the recording material P by the pressing roller 23 is faster than the moving speed of the surface of the photosensitive drum 1 by the thermal expansion of the pressing roller 23. That is, it is possible to subtract the value of the counter M in a case that the extension of the sheet interval process is executed. On the other hand, in the case that the extension of the post rotation process is executed, it is not possible to subtract the value of the counter M since there is no process in which the recording material P slides on the photosensitive drum 1 and the discharge products on the surface of the photosensitive drum 1 are not removed. The value of the counter M is stored in the memory 152 and inherited to the start of the next job.

In this way, it is possible to prepare for the next job while the water which is accumulated on the brush member 10 does not remain by executing the extension of the post rotation process; however, the discharge products which are deposited on the surface of the photosensitive drum 1 are taken over to the next job as they are.

As described above, in the embodiment, the time of the extended sheet interval process and the time of the extended post rotation process are determined according to the value of the counter K which is updated based on information of "the number of the image forming sheets" and information of "the time of the sheet interval process". In this way, it is possible to control the amount of the water which is accumulated in the brush member 10. In addition to this, in the embodiment, the number of the repeated extensions of the time of the extended sheet interval process and the time of the extended post rotation process are determined according to the value of the counter M which is updated based on information of "the number of the image forming sheets" and information of "the time of the sheet interval process". In this way, it is possible to control the amount of the discharge products which are deposited on the surface of the photosensitive drum 1. Therefore, according to the embodiment, it is possible to suppress the occurrence of the image deletion throughout the lifetime of the photosensitive drum 1.

Figure 7:
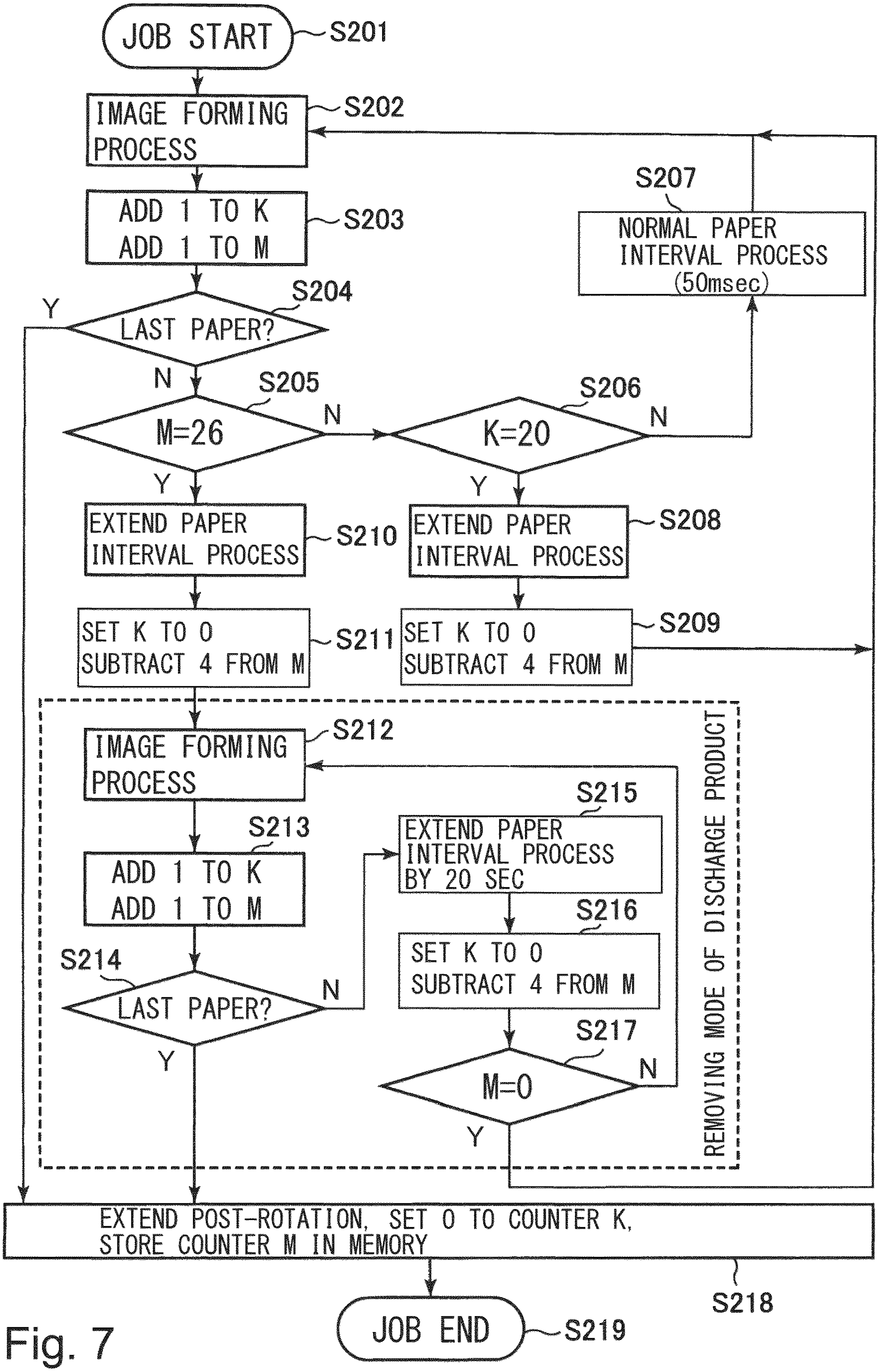
FIG. 7 is a flow chart of control according to a second embodiment.

5. Procedure for Setting the Time of the Sheet Interval Process and the Post Rotation Process FIG. 7 is a flowchart diagram outlining the procedure for a job that includes extension operations of the sheet interval process and the post rotation process in the embodiment.

S201: The control portion 150 obtains information about a job which is sent from an external device based on user's operation.

S202: The control portion 150 executes the image forming process.

S203: The control portion 150 adds one to each of the value of the counter K and the value of the counter M at a timing when the recording material P is fed.

From S204 through S207: In S204, the control portion 150 determines whether a next image forming is a last image forming of the job, that is, whether the recording material P which is conveyed next is a last sheet. Further, in S205, the control portion 150 determines whether the value of the counter M has reached 26 (that is, whether the value of the counter M is equal to 26). Further, in S206, the control portion 150 determines whether the value of the counter K has reached 20 (that is, whether the value of the counter K is equal to 20). And in a case that the control portion 150 determines that it is the last paper (Y in S204), it goes to the post rotation process (S218). Further, in a case that the control portion 150 determines that it is not the last sheet (N in S204), determines the value of the counter M is not equal to 26 (less than 26) and determines whether the value of the counter K is equal to 20 (less than 20) (N in S206), it goes through the usual sheet interval process (S207) and goes to the next image forming process (S202). In the embodiment, the usual time of the sheet interval process is 50 msec.

S208: In a case that the control portion 150 determines that the value of the counter K is equal to 20 in S206 (Y in S206), the extension of the sheet interval process (S208) according to the value of the counter K following Table 4 is executed. In the embodiment, the time of the sheet interval process which is performed in S208 is 45 seconds.

S209: When the control portion 150 executes the extension of the sheet interval process in S208, it resets the value of the counter K to zero, assuming that the water which is accumulated in the brush member 10 is almost zero. This is because it is possible to remove the water which is accumulated in the brush member 10 by discharging it little by little during the extension of the sheet interval process in S208. Further, when the control portion 150 executes the extension of the sheet interval process in S208, the value of the counter M is subtracted by 4, assuming that the discharge products on the surface of the photosensitive drum 1 are reduced. This is because it is possible to scrape off the discharge products which are deposited on the photosensitive drum 1, when the recording material P, which is conveyed faster than the moving speed of the surface of the photosensitive drum 1 by the pressing roller 23, which is expanded by the extension of the sheet interval process, slides on the surface of the photosensitive drum 1. After that, the control portion 150 goes to the image forming process (S202) when the extension of the sheet interval process is finished.

From S210 through S211: In a case that the control portion 150 determines that the value of the counter M is equal to 26 in S205 (Y in S205), the extension of the sheet interval process (S210) according to the value of the counter K following Table 4 is executed. In the embodiment, the time of the sheet interval process which is shown in Table 4 includes a purpose of removing the water which is accumulated in the brush member 10, and when the extension of the time of the sheet interval process is executed following Table 4, the amount of the water which is accumulated in the brush member 10 is almost zero. Therefore, the control portion 150 executes the extension of the sheet interval process in S210, it resets the value of the counter K to zero (S211). Further, in a range of 20 seconds or more for the sheet interval process, the ability of the recording material P to remove the discharge products from the surface of the photosensitive drum 1 is almost constant. Therefore, the control portion 150 executes the extension of the sheet interval process in S210, the value of the counter M is uniformly subtracted by four (S211).

From S212 through S217: The control portion 150 determines that the value of the counter M is equal to 26 in S205 (Y in S205), it enters the discharge product removing mode after processing S210 and S211. In the embodiment, each of the value of the counter K and the value of the counter M is added by one (S213), each time when executing one sheet of the image forming process (S212), during the discharge product removing mode. After that, the control portion 150 determines whether the next image forming is the last image forming of the job, that is, whether the recording material P which is conveyed next is the last sheet. And in a case that the control portion 150 determines that it is not the last paper (N in S214), it executes the sheet interval process for 20 seconds according to the value of the counter K following Table 4 (S215). When the control portion 150 extends the time of the sheet interval process to 20 seconds, it resets the value of the counter K to 0 and subtracts the value of the counter M by 4 (S216). The control portion 150 repeats this procedure from S212 through S216 until the value of the counter M becomes 0 (S217). When the value of the counter M becomes 0 (Y in S217), the control portion 150 escapes from the discharge product releasing mode and goes to the image forming process (S202) in the usual sheet interval process (S207), assuming that the discharge products on the surface of the photosensitive drum 1 is almost removed.

S218: In a case that the control portion 150 determines that it is the last paper in S204 or S214 (Y in S204, Y in S214), the control portion 150 executes the post rotation process for the time corresponding to the current value of the counter K according to Table 4. Further, when the post rotation process is finished, the control portion 150 resets the value of the counter K to 0, assuming that the water which is accumulated in the brush member 10 is dried. On the other hand, the control portion 150 does not update the value of the counter M, since it is not possible to remove the discharge products on the surface of the photosensitive drum 1 without conveying the recording material P even when the post rotation process is extended. The value of the counter M is stored in the memory 152 and inherited to the next job.

S219: The control portion 150 completes the job when the post rotation process is completed.

6. Effect

In order to confirm an effect of the embodiment, an experiment was conducted to examine the occurrence of the image deletion every ten sheets when a job in which 50 sheets of image forming are executed by using the moisture absorbed recording material P for each of a product of the photosensitive drum 1 and the photosensitive drum 1 which has been used for 10,000 sheets of image forming. The experiment was conducted under an environment of temperature 15° C./humidity 80% (low temperature and high humidity), where the water tends to accumulate in the brush member 10 and the image deletion is likely to occur locally. The recording material P which was used in the experiment was Xerox Vitality Multipurpose paper, letter size, basis weight 75 g/m$^2$, and had been left under an environment of temperature 15° C./humidity 80% (low temperature and humid environment) for two days after being taken from a wrapping paper. The water content of the paper was 9.2% as measured with a Moistrex MX-8000 moisture content measuring device which is manufactured by NDC Infrared Engineering. Further, for comparison, the water content of the paper was 5.7% when it is measured immediately after opening a package.

Similar experiments were conducted for the comparative example 5. The comparative example 5 is an example in a case that it is a configuration in which the brush member 10 is arranged and the sheet interval process is extended, however, the extension of the sheet interval process is executed only for a purpose of ensuring that the amount of the water which is accumulated in the brush member 10 does not become too much. The comparative example 5 corresponds to a modified example of the first embodiment which is described above, and is included in the embodiment.

The results are shown in Table 5. In Table 5, "o" indicates that the image deletion has not occurred, "Δ" indicates that the image deletion has occurred only slightly, and "x" indicates that the image deletion has occurred significantly.

Incidentally, the photosensitive drum 1 after being used for 10,000 sheets of image forming means the photosensitive drum 1 in a state in which a total number of image forming sheets is 10,000 sheets after repeatedly executing the jobs of 50 sheets of image forming by a way of image forming in each example. Incidentally, in the embodiment, a lifetime of the main assembly 101 of the image forming apparatus 100 is set at 50,000 sheets of the image forming sheets.

TABLE 5

| | BRUSH | 10 | 20 | 30 | 40 | 50 |
|---|---|---|---|---|---|---|
| New Product | | | | | | |
| COMP. 5 | YES | ○ | ○ | ○ | ○ | ○ |
| EMBD. 2 | YES | ○ | ○ | ○ | ○ | ○ |
| After 10,000 sheets | | | | | | |
| COMP. 5 | YES | ○ | Δ | ○ | ○ | Δ |
| EMBD. 2 | YES | ○ | ○ | ○ | ○ | ○ |

Extension of the sheet interval process

COMP. 5 Extension/Yes

*Considering the amount of the water which is accumulated in the bush 20 sheets => 45 seconds => 7 sheets => 35 second => 3 sheets => 20 second => 20 sheets EMBD. 2 Extension/YES 20 sheets => 45 seconds => 10 sheets => 35 seconds (=>1 sheet => 20 seconds) x 8 => 12 sheets As seen in the results of the comparative example 4 which is described above (Table 2), in a case that it is a configuration in which the brush member 10 is mounted, the image deletion does not occur even when continuous image forming is performed for as much as 20 sheets of the image forming sheets. However, when continuous image forming is continued further without the extension of the sheet interval process, the water which is accumulated in the brush member 10 may locally flow out, and the image deletion occurs in a region in which the water locally flows out after 25 sheets of the image forming sheets.

In the comparative example 5, the extension of the sheet interval process is executed for a purpose of preventing too much water from accumulating in the brush member 10. In the comparative example 5, a job with 50 sheets of image forming is performed as follows. The time of the sheet interval process is extended to 45 seconds after 20 sheets of continuous image forming. Then, the time of the sheet interval process is extended to 35 seconds after 7 sheets of continuous image forming. Then, the time of the sheet interval process is extended to 20 seconds after 3 sheets of continuous image forming. Since the water which is accumulated in the brush member 10 is almost zero at this point, 20 sheets of the continuous image forming are performed. And finally, when the time of the post rotation process is extended to 60 seconds, the water which is accumulated in the brush member 10 is reset to almost zero, and the job is finished. In the comparative example 5, since there is no chance that too much water is accumulated in the brush member 10 and the water locally flows out onto the surface of photosensitive drum 1, it is possible to suppress occurrence of the localized image deletion. However, on the photosensitive drum 1, which has repeatedly performed 50 sheets of such image forming for a total of 10,000 sheets of image forming, the discharge products are deposited. Therefore, the photosensitive drum 1 is more likely to realize the image deletion than in a case that the photosensitive drum 1 is a new product, and the image deletion begins to occur after approximately 15 sheets of continuous image forming are performed. Therefore, the image deletion occurs slightly in the 20th sheet and the 50th sheet at a timing after 20 sheets of continuous image forming are performed.

In the embodiment, by providing a mode (discharge product removing mode) in which the sheet interval process of 20 seconds is repeated eight times for each image forming process, it is possible to suppress the occurrence of the image deletion even after the photosensitive drum 1 has been used for 10,000 sheets. This is due to an effect of being able to do the following in the embodiment, as opposed to the comparative example 5, in which continuous image formations are continued and the temperature of the pressing roller 23 is likely decreased. That is, in the embodiment, image forming one sheet at a time is repeated eight times, while the thermal expansion of the pressing roller 23 is promoted by the extension of the sheet interval process. Therefore, when the moving speed of the recording material P is faster than the moving speed of the surface of the photosensitive drum 1, the recording material P slides on the surface of the photosensitive drum 1, so it is possible to remove the discharge products which are deposited on the surface of the photosensitive drum 1. Incidentally, repeating the sheet interval process of 20 seconds eight times for each image forming process of one sheet also has an effect of gradually removing the water which is accumulated in the brush member 10, so it is also possible to suppress the image deletion which occurs locally when the water locally flows from the brush member 10 onto the surface of the photosensitive drum 1.

In this way, in the embodiment, the transfer member 5 nips and conveys the recording material P with the photosensitive member 1 at a transfer portion Nt, the image forming apparatus 100 further includes a rotating member pair 23 and 24 which heats the recording material P while nipping and conveying the recording material P at a heating portion Nf, and the control portion 150 is possible to control so that the moving speed of the third recording material P which is simultaneously nipped and conveyed between the heating portion Nf and the transfer portion Nt is faster than the moving speed of the surface of the photosensitive member 1 in the time of the second non-image-forming process. Further, in the embodiment, in a case that the time of the first non-image-forming process is defined as a third time and the time of the second non-image-forming process which is longer than the third time is defined as a fourth time, the control portion 150 is able to control to perform image forming on the recording material P with the non-image-forming process time as the third time after image forming is performed continuously on the plurality of recording materials P with the non-image-forming process as the fourth time after the second recording material P.

As described above, in the embodiment, the thermal expansion of the pressing roller 23 is promoted by extending the time of the sheet interval process, and the surface of the photosensitive drum 1 is slid with the recording material P by increasing the difference between the moving speed of the recording material P and the moving speed of the surface of the photosensitive drum 1. Therefore, in the embodiment, the amount of the discharge products which are deposited on the surface of the photosensitive drum 1 is reduced, so it is possible to form stable images without the image deletion throughout the lifetime of the photosensitive drum 1.

7. Modified Example

Incidentally, in the embodiment, the image forming apparatus 100 is configured that the photosensitive drum 1 and the fixing roller 23 are driven by a common motor (one motor configuration), however, the present invention is also able to apply to an image forming apparatus in which they are driven by separate motors (two motor configuration). Even in such a configuration, it is possible to increase the conveying speed of the recording material P by the pressing roller 23, while a driving speed of the pressing roller 23 is increased under a condition that the image deletion is likely to occur. Therefore, the surface of the photosensitive drum 1 is slid with the recording material P, and the discharge products which are deposited on the surface of the photosensitive drum 1 are removed, so it is possible to suppress the occurrence of the image deletion.

Further, in the embodiment, the number of the continuous image forming sheets is designed to be as much as possible without the image deletion occurring, taking usability (productivity) into consideration; however, the present invention is not limited to such a mode. In the embodiment, it is sufficient to control the discharge products which are deposited on the surface of the photosensitive drum 1 so that there is not too much discharge products and not too much water which is accumulated in the brush member 10. In the embodiment, for example, the image deletion does not occur until 10 sheets of the continuous image forming, even with the photosensitive drum 1 on which the discharge products have been deposited for 10,000 sheets of image forming. Therefore, for example, by fixing the number of the continuous image forming sheets and the time of the extended non-image-forming process at 5 sheets and 30 seconds, respectively, it is possible to suppress the image deletion throughout the lifetime of the photosensitive drum 1.

Further, a parameter, for updating the value of the counter M which represents the amount of the discharge products which are deposited on the photosensitive drum 1, is not limited to the one in the embodiment. The parameter which increases the value of the counter M may be any parameter which correlates with a phenomenon of depositing the discharge products on the surface of the photosensitive drum 1. As for the parameter, for example, it is possible to use the number of the continuous image forming sheets in the usual time of the sheet interval process, a cumulative time of the image forming process when image forming is performed continuously in the usual time of the sheet interval process or the number of rotations and rotation distance of the photosensitive drum 1 during that time, the charging voltage application time and exposure time, etc. Further, the parameter which decreases the value of the counter M may be a parameter which correlates with the phenomenon of decreasing the discharge products which are deposited on the surface of the photosensitive drum 1. As for this parameter, for example, the time of the extended sheet interval process, or the number of rotations of the photosensitive drum 1 and the rotation distance during that time, etc., may be used. Incidentally, as described above, the number of rotations or the rotation distance, etc., may be used in addition to the number of the sheets or time. Further, a coefficient which corresponds to an actual moving speed of the recording material P and an actual amount of thermal expansion of the pressing roller 23 may be stored in the memory 152, and a parameter for decreasing the value of the counter M may reflect a degree to which the recording material P slides on the surface of the photosensitive drum 1 and a degree to which the discharge products are removed.

Further, in the embodiment, the discharge product removing mode is provided in which the sheet interval process is extended to 20 seconds for each one sheet of image forming eight times from a state that the photosensitive drum 1 is a new product, however, the present invention is not limited to such a mode. The value of the counter may reflect the total number of the image forming sheets, and the discharge product mode may be executed in a case that the total number of the image forming sheets exceeds a predetermined value, etc. For example, in a case that the photosensitive drum 1 is a new product, it is possible to only remove the water which is accumulated in the brush member 10 as in the first embodiment. Then, at a timing when the total number of the image forming sheets exceeds the predetermined value and the amount of the discharge products which are deposited on the surface of the photosensitive drum 1 has increased, the discharge products may be removed in the discharge product removal mode.

Further, in the embodiment, a temperature which is controlled during the extension of the sheet interval process is kept constant at −60° C. (that is 120° C.) relative to the temperature control temperature during the image forming process (during the fixing process), however, the present invention is not limited to such a mode. In order to further promote thermal expansion of the pressing roller 23, for example, the temperature control temperature may be configured to increase only in the discharge product removing mode. In a case that the thermal expansion of the pressing roller 23 is further promoted and the moving speed of the recording material P is further increased relative to the moving speed of the surface of the photosensitive drum 1, an effect of removing the discharge products which are deposited on the photosensitive drum 1 is further enhanced. Therefore, in addition to increasing the temperature control temperature during the extension of the sheet interval process, the number of the continuous image forming sheets which can be performed may be increased or the number of repetitions in the discharge product removing mode may be reduced. By such an operation, it is possible to improve a usability (productivity).

Further, in the embodiment, the recording material P is conveyed faster than the moving speed of the surface of the photosensitive drum 1 as a method of sliding and scraping the discharge products which are deposited on the surface of the photosensitive drum 1, however, the present invention is not limited to such a mode. In the embodiment, it is sufficient that the configuration is able to remove the discharge products by sliding on the surface of the photosensitive drum 1. For example, a configuration in which the developing roller 31 and the charging roller 2 are rotated at different peripheral speeds relative to the photosensitive drum 1 to scrape the discharge products from the surface of the photosensitive drum 1 is also effective. In a case of such a method, it is possible to remove the discharge products by extending the post rotation process (or the pre rotation process) as well as by extending the sheet interval process.

As described above, the present invention is described according to the specific embodiments, however, the present invention is not limited to the embodiments which are described above.

Dimensions, materials and shapes of component parts which are described in the embodiments above and relative arrangements should be changed according to the configuration and various conditions of the apparatus to which the invention is applied.

In the embodiments which are described above, a printer is exemplified as an image forming apparatus, however, the present invention is not limited to such a mode. In the present invention, it is possible to apply to other image forming apparatuses such as a copier and a fax machine, for example, or other image forming apparatuses in which these functions are combined, and it is possible to obtain the same effect as the embodiments which are described above.

According to the embodiment, it is possible to suppress the image deletion in a configuration which includes a brush member which is arranged to abut against a surface of a photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-002596, filed Jan. 11, 2022, which is hereby incorporated by reference herein in its entirety.

What is claimed is:

1. An image forming apparatus configured to perform an image forming operation for forming an image on a recording material, the image forming apparatus comprising:

a rotatable photosensitive member;

a charging member configured to electrically charge a surface of the photosensitive member at a charging portion;

a developing member configured to supply toner to the surface of the electrically charged photosensitive member to form a toner image;

a transfer member configured to transfer the toner image from the photosensitive member to the recording material at a transfer portion;

a brush contacting the surface of the photosensitive member downstream of the transfer portion and upstream of the charging portion with respect to a rotational direction of the photosensitive member and configured to form a contacting portion;

a driving source configured to rotatably drive the photosensitive member; and a control portion configured to control the driving source, wherein when a rotating operation in which the photosensitive member is rotated in a period from when the image forming operation on the recording material is finished until the image forming operation on a subsequent recording material is performed is defined as a sheet interval operation, the control portion, in a case of controlling so as to continuously perform the image forming operation on the recording materials, controls so as to:

i) perform a first sheet interval operation for a first period of time after continuously performing a first image forming operation on a first number of the recording materials, ii) continuously perform a second image forming operation on a second number of the recording materials after performing the first sheet interval operation, the second number being less than the first number, and iii) perform a second sheet interval operation for a second period of time shorter than the first period of time after performing the second image forming operation.

2. The image forming apparatus according to claim 1, wherein the control portion controls so as to continuously perform a third image forming operation on a third number of the recording materials after performing the second sheet interval operation, the third number being less than the second number.

3. The image forming apparatus according to claim 2, wherein the control portion controls so as to perform a third sheet interval operation for a third period of time shorter than the second period of time after performing the third image forming operation.

4. The image forming apparatus according to claim 3, wherein the control portion controls so as to perform a fourth sheet interval operation for a fourth period of time equal to or shorter than the second period of time after performing the third image forming operation.

5. The image forming apparatus according to claim 1, wherein the control portion controls so as to continuously perform a third image forming operation to a third number of the recording materials after performing the second sheet interval operation, the third number being greater than the second number.

6. The image forming apparatus according to claim 1, wherein the charging member contacts the image bearing member at the charging portion.

7. The image forming apparatus according to claim 1, wherein a density of base materials of the brush is 280kF/inch$^2$.

8. The image forming apparatus according to claim 1, wherein the control portion controls the developing member to collect the toner remaining on the surface of the photosensitive member after transferring the toner image from the photosensitive member to the recording material.

* * * * *